(12) United States Patent
Kim et al.

(10) Patent No.: US 8,503,561 B2
(45) Date of Patent: Aug. 6, 2013

(54) METHOD AND APPARATUS OF TRANSMITTING REFERENCE SIGNAL FOR UPLINK TRANSMISSION

(75) Inventors: Byoung-Hoon Kim, Anyang-si (KR); Dae Won Lee, Anyang-si (KR); Byeongwoo Kang, Anyang-si (KR); Bong Hoe Kim, Anyang-si (KR); Yujin Noh, Anyang-si (KR)

(73) Assignee: LG Electronics Inc., Seoul (KR)

( * ) Notice: Subject to any disclaimer, the term of this patent is extended or adjusted under 35 U.S.C. 154(b) by 284 days.

(21) Appl. No.: 12/458,216

(22) Filed: Jul. 2, 2009

(65) Prior Publication Data
US 2010/0002800 A1    Jan. 7, 2010

Related U.S. Application Data

(60) Provisional application No. 61/161,412, filed on Mar. 19, 2009, provisional application No. 61/165,917, filed on Apr. 2, 2009.

(30) Foreign Application Priority Data

Jul. 2, 2008 (KR) .................. 10-2008-0064101

(51) Int. Cl.
*H04B 7/02* (2006.01)
*H04B 7/04* (2006.01)
*H04B 7/06* (2006.01)
*H04B 7/08* (2006.01)
*H04B 1/10* (2006.01)

(52) U.S. Cl.
CPC ............. *H04B 7/02* (2013.01); *H04B 7/0404* (2013.01); *H04B 7/0682* (2013.01); *H04B 7/0825* (2013.01); *H04B 2201/71632* (2013.01); *H04B 2215/00* (2013.01); *H04B 1/10* (2013.01)
USPC ........... 375/267; 375/260; 375/295; 375/299; 375/358; 455/63.1; 455/91; 455/114.2; 455/101

(58) Field of Classification Search
CPC ........ H04B 7/02; H04B 7/0404; H04B 7/0628; H04B 7/0682; H04B 7/0825; H04B 2201/71632; H04B 2215/00; H04B 1/00
USPC ........ 375/260, 296, 267, 299, 358; 455/63.1, 455/91, 114.2, 101
See application file for complete search history.

(56) References Cited

U.S. PATENT DOCUMENTS

2007/0183386 A1 * 8/2007 Muharemovic et al. ...... 370/344
2008/0298433 A1 * 12/2008 Tiirola et al. .................. 375/132

* cited by examiner

*Primary Examiner* — Leila Malek
(74) *Attorney, Agent, or Firm* — McKenna Long & Aldridge LLP

(57) ABSTRACT

A method and apparatus of transmitting a reference signal in a wireless communication system is provided. The method includes generating a precoded reference signal or a non-precoded reference signal in accordance with a rank, and transmitting the generated reference signal. Uplink transmission using multiple transmit antennas is supported through reference signal design and related control signaling.

16 Claims, 22 Drawing Sheets

FIG. 15
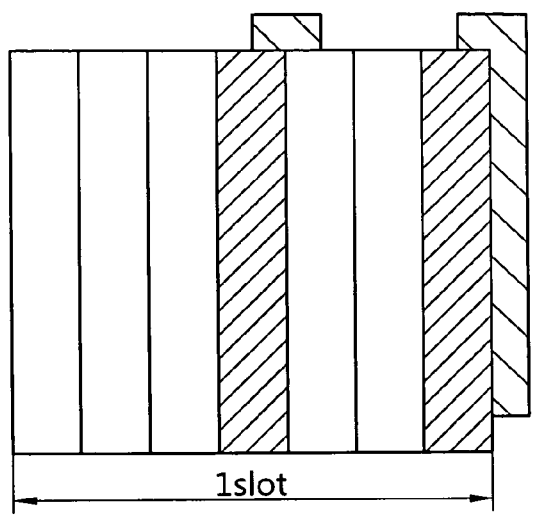
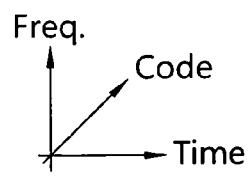

FIG. 16
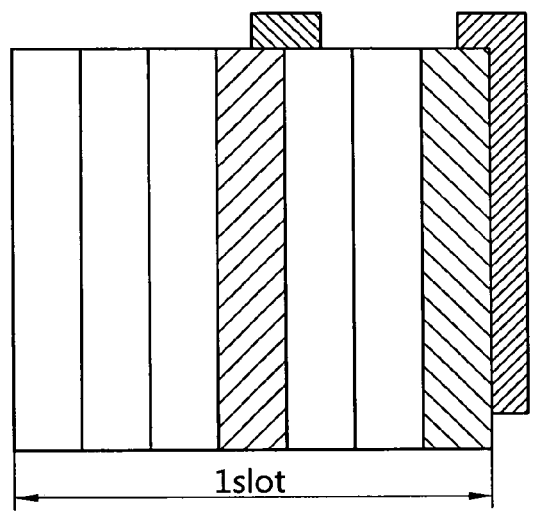
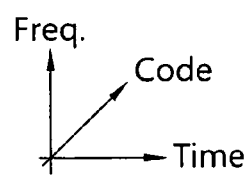

FIG. 20
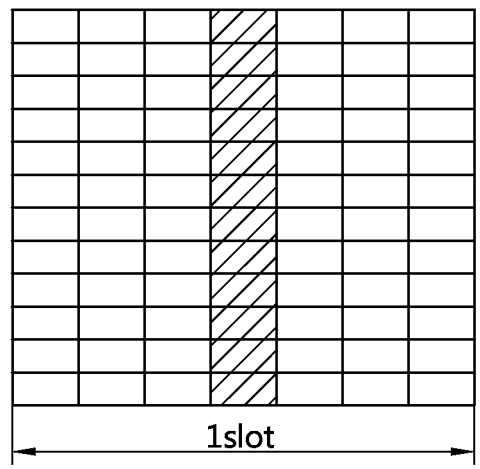
SC-FDMA MODE
☒ RS for SC-FDMA
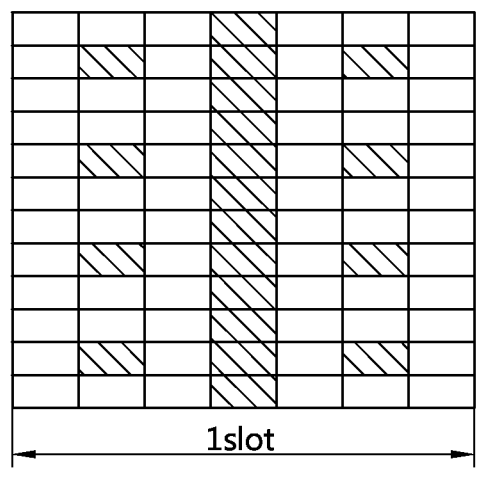
OFDMA MODE
◨ RS for OFDMA

METHOD AND APPARATUS OF TRANSMITTING REFERENCE SIGNAL FOR UPLINK TRANSMISSION

CROSS-REFERENCE TO RELATED APPLICATIONS

This application claims the benefit of priority of Korean Patent Application No. 10-2008-0064101 filed on Jul. 2, 2008, U.S. Provisional Application 61/161,412 filed on Mar. 19, 2009, and U.S. Provisional Application 61/165,917 filed on Apr. 2, 2009, all of which are incorporated by reference in their entirety herein.

BACKGROUND OF THE INVENTION

1. Field of the Invention

The present invention relates to wireless communication, and more particularly, to a method and apparatus of providing a reference signal used for uplink transmission.

2. Related Art

Wireless communication systems providing a variety of kinds of communication services such as audio and data are widely developed. In general, a wireless communication system is a multiple access system capable of supporting communication with multiple users by using available system resources (bandwidths, transmission power, etc.). Examples of the multiple access system include CDMA (Code Division Multiple Access) system, FDMA (Frequency Division Multiple Access) system, TDMA (Time Division Multiple Access) system, OFDMA (Orthogonal Frequency Division Multiple Access) system, SC-FDMA (Single Carrier-Frequency Division Multiple Access) system, etc.

An MIMO (Multiple Input Multiple Output) system employs Nt ($Nt \geq 1$) transmit antennas and Nr ($Nr \geq 1$) receive antennas. An MIMO channel composed of the Nt transmit antennas and the Nr receive antennas may be decomposed into Ns independent channels. Here, $Ns \leq \min\{Nt, Nr\}$. An independent channels may be referred to as a spatial layer. A rank has a value corresponding to the number of available independent channels. The MIMO system can provide high spectral efficiency, improved throughput and high reliability through multiple independent channels.

The MIMO system can be classified into SU-MIMO (Single User MIMO) and MU-MIMO (Multi-User MIMO). The SU-MIMO is used to increase a peak data rate for each user while the MU-MIMO is used to increase call (or sector) capacity. The SU-MIMO uses spatial multiplexing and/or spatial diversity in order to provide high throughput and reliability. The MU-MIMO uses SDMA (Spatial Division Multiple Access) or multi-user multiplexing in order to increase capacity.

SC-FDMA has a peak-to-average power ratio (PAPR) lower than that of OFDMA because of single carrier property while having complexity similar to that of OFDMA. Low PAPR is advantageous to user equipment (UE) in terms of transmission power efficiency, and thus SC-FDMA is adopted for uplink transmission in 3rd generation partnership project long term evolution (3GPP LTE) as described in the Clause 5 of 3GPP TS 36.211 V8.2.0 (2008-03) "Technical Specification Group Radio Access Network; Evolved Universal Terrestrial Radio Access (E-UTRA); Physical channels and modulation (Release 8)".

The uplink transmission in the 3GPP standard defines only single stream transmission trough a single transmit antenna. Even though a UE has two or more transmit antennas, only transmit antenna selection or transmit antenna switching is supported and multi-stream transmission or preceding is not supported.

In general, data can suffer from easily through a wireless channel (so called frequency selective channel). So a reference signal (RS) that already known to both a transmitter and a receiver is transmitted with data information at the same time for channel estimation. The RS may be referred to as a pilot. There are two kinds of roles which the RS does: demodulation and channel measurement. The RS for demodulation may be called as demodulation RS (DMRS). DMRS can be classified into a precoded RS and a non-precoded RS whether to be multiplexed with precoding matrix or not.

In the Clause 5.5 of the 3GPP TS 36.211, at least one resource block is allocated to a PUSCH (Physical Uplink Shared Channel) that carries uplink data and a RS having a length corresponding to the allocated resource block is assigned. A resource block represents time/frequency resources. A resource block is defined as 12 subcarriers over a slot. Multiple UEs may simultaneously transmit data and RSs on the same resource block. The sequences used for the RSs may be defined by cyclic shifts of a base sequence. The base sequence may be Zadoff-Chu (ZC) sequence.

Meanwhile, ITU (International Telecommunication Union) is standardizing IMT-Advance system which provides 1 Gbps at a low rate and 100 Mbps at a high rate to support IP (Internet Protocol) based multimedia seamless service as a next-generation mobile communication system following 3rd generation mobile communication systems. The 3GPP considers a 3GPP LTE-Advanced (LTE-A) system as a candidate technology for the IMT-Advanced system. The LTE-A system is developed to achieve an improved LTE system and to maintain backward compatibility with the LTE system.

Among requirements of the LTE-A system, the improvement of an uplink peak data rate is particularly emphasized because only SC-FDMA using a single antenna is difficult to satisfy peak data rate requirement required by the IMT-Advanced system. An MIMO system that supports multi-stream transmission or precoding and a hybrid system of OFDMA having high frequency efficiency and the existing SC-FDMA are considered as a system for improving a data rate.

One of important issues for data transmission is the design of RS. In the MIMO system or hybrid system for uplink transmission, RS design, RS allocation and related signaling are not defined yet.

SUMMARY OF THE INVENTION

The present invention provides a method and apparatus of transmitting a reference signal for uplink transmission in a multiple antenna system.

In an aspect, a method of transmitting a reference signal in a wireless communication system is provided. The method includes generating a precoded reference signal or a non-precoded reference signal in accordance with a rank, and transmitting the generated reference signal.

If the value of the rank is smaller than a threshold value, the precoded reference signal may be generated. The threshold value may be indicated by a base station.

The precoded reference signal may be generated by multiplying a first precoding matrix and a second precoding matrix with the non-precoded reference signal. The first precoding matrix may be in a first symbol and the second precoding matrix may be in a second symbol. The first precoding matrix may be in a first slot and the second precoding matrix may be in a second slot. The first precoding matrix may be in a first subblock and the second precoding matrix may be in a second subblock.

In another aspect, a user equipment includes a radio frequency (RF) unit for transmitting a radio signal, and a processor operatively coupled with the RF unit and configured to generate a precoded reference signal or a non-precoded reference signal in accordance with a rank, and transmit the generated reference signal.

Uplink transmission using multiple transmit antennas is supported through reference signal design and related control signaling. Uplink transmission efficiency can be increased so as to improve the overall performance of a wireless communication system.

BRIEF DESCRIPTION OF THE DRAWINGS

FIG. 15 illustrates an example of allocation of two OFDMA symbols to a RS in a slot.

FIG. 16 illustrates another example of allocation of two OFDMA symbols to a RS in a slot.

FIG. 20 illustrates an example of RS structures according to the SC-FDMA and OFDMA modes.

DESCRIPTION OF EXEMPLARY EMBODIMENTS

Figure 1:
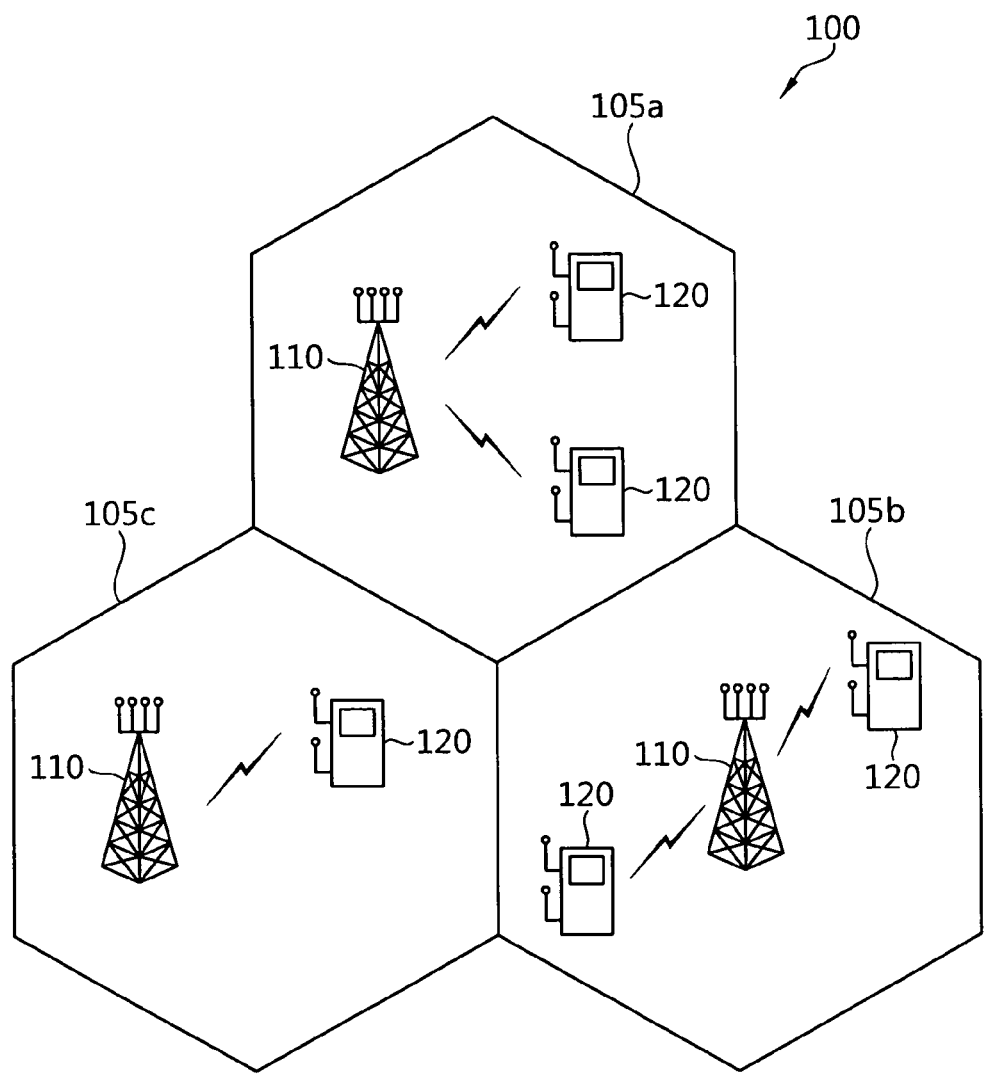
FIG. 1 illustrates a wireless communication system.

FIG. 1 illustrates a wireless communication system 100. The wireless communication system 100 includes at least one base station (BS) 110. Each BS 110 provides a communication service for a specific geographic area 105a, 105b and 105c (generally referred to as a cell). A cell may be divided into a plurality of regions (referred to as sectors). A user equipment (UE) 120 may be fixed or mobile and also referred to as a mobile station (MS), user terminal (UT), subscriber station (SS), mobile terminal, wireless device, etc. The BS 110 corresponds to a fixed station communicating with the UE 120 and may be referred to as an evolved-node B (eNB), a base transceiver system (BTS), access point, etc.

The wireless communication system 100 may be multiple antenna system or MIMO (multiple input multiple output) system which has at least one transmit (Tx) antenna and/or at least one receive (Rx) antenna.

When there are Nt transmit antennas and Nr receive antennas, a theoretical channel transmission capacity of the MIMO system increases in proportion to the number of antennas, so that a data rate and a frequency efficiency can greatly increase. The rate increment (Ri) can be represented by Ri=min(Nt, Nr).

A transmit vector s can be represented as shown:

$$s=[s_1, s_2, \ldots, s_{Nt}]^T \qquad \text{[Equation 1]}$$

where $s_i$ denotes a transmit symbol transmitted by i-th transmit antenna. Each transmit symbols $(S_1, S_2, \ldots, S_{Nt})$ may have different transmission powers. If the individual transmission powers are denoted by $(P_1, P_2, \ldots, P_{Nt})$, transmit signals with an adjusted transmission power can be represented as shown:

$$\hat{s} = [\hat{s}_1, \hat{s}_2, \ldots, \hat{s}_{Nt}]^T = \begin{bmatrix} P_1 & & 0 \\ & P_2 & \\ & & \ddots \\ 0 & & P_{Nt} \end{bmatrix} \begin{bmatrix} s_1 \\ s_2 \\ \vdots \\ s_{Nt} \end{bmatrix} = Ps \qquad \text{[Equation 2]}$$

where P is a diagonal matrix of transmission powers.

The power adjusted transmit vector $\hat{s}$ may be multiplied by a weight matrix W, so that Nt transmit signals $(x_1, x_2, \ldots, X_{Nt})$ to be actually transmitted are configured. The weight matrix is adapted to properly distribute transmit symbols to individual antennas according to channel situations. A transmit signal vector x can be represented as shown:

$$x = \begin{bmatrix} x_1 \\ x_2 \\ \vdots \\ x_i \\ \vdots \\ x_{Nt} \end{bmatrix} = \begin{bmatrix} w_{11} & w_{12} & \ldots & w_{1Nt} \\ w_{21} & w_{22} & \ldots & w_{2Nt} \\ \vdots & & \ddots & \vdots \\ w_{i1} & w_{i2} & \ldots & w_{iNt} \\ \vdots & & \ddots & \vdots \\ w_{Nt1} & w_{Nt2} & \ldots & w_{NtNt} \end{bmatrix} \begin{bmatrix} \hat{s}_1 \\ \hat{s}_2 \\ \vdots \\ \hat{s}_j \\ \vdots \\ \hat{s}_{Nt} \end{bmatrix} = W\hat{s} = WPs \qquad \text{[Equation 3]}$$

where $w_{ij}$ is a weight between the i-th transmit antenna and the j-th transmit symbol. The matrix W is called a weight matrix or a precoding matrix. In the meantime, the transmit signal vector x can be considered in different ways according to two cases, i.e., a first case in which the spatial diversity is used and a second case in which the spatial multiplexing is used. In the spatial multiplexing, different transmit symbols are multiplexed in the transmit signal vector. In the spatial diversity, the same transmit symbols are multiplexed in the transmit signal vector which means that same transmit signals are transmitted through all transmit antennas. The combination of the spatial multiplexing scheme and the spatial diversity scheme may also be considered.

A receive signal vector y may be represented as shown:

$$y = \begin{bmatrix} y_1 \\ y_2 \\ \vdots \\ y_i \\ \vdots \\ y_{Nr} \end{bmatrix}$$ [Equation 4]

$$= \begin{bmatrix} h_{11} & h_{12} & \cdots & h_{1Nt} \\ h_{21} & h_{22} & \cdots & h_{2Nt} \\ \vdots & & \ddots & \\ h_{i1} & h_{i2} & \cdots & h_{iNt} \\ \vdots & & \ddots & \\ h_{Nr1} & h_{Nr2} & \cdots & h_{NrNt} \end{bmatrix} \begin{bmatrix} x_1 \\ x_2 \\ \vdots \\ x_j \\ \vdots \\ x_{Nt} \end{bmatrix} + \begin{bmatrix} n_1 \\ n_2 \\ \vdots \\ n_i \\ \vdots \\ n_{Nr} \end{bmatrix}$$

$$= Hx + n$$

where $y_i$ denotes a receive signal received by i-th receive antenna, $h_{ij}$ is a channel from j—the transmit antenna to i—the receive antenna, and n is a Additive White Gaussian Noise (AWGN) vector. The channel matrix H is denoted by NrxNt matrix.

A rank is the number of spatial layers and corresponds to the number of streams to be transmitted simultaneously via multiple antenna. The maximum value of the rank is equal to min(Nt, Nr).

Figure 2:
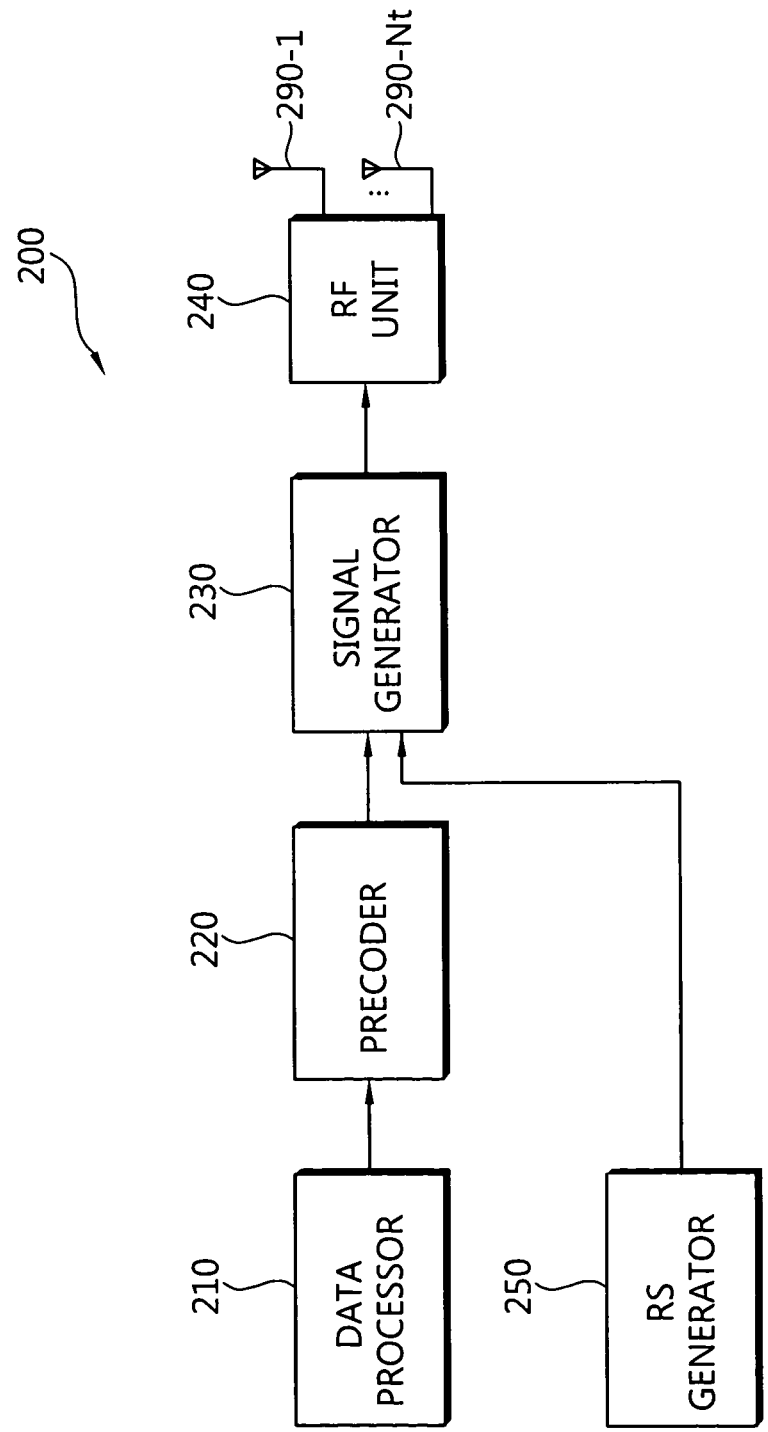
FIG. 2 is a block diagram of a transmitter having multiple transmit antennas according to an embodiment of the present invention.

FIG. 2 is a block diagram of a transmitter having multiple transmit antennas according to an embodiment of the present invention. A transmitter 200 includes a data processor 210, a precoder 220, a signal generator 230 and a reference signal (RS) generator 250. The data processor 210 processes information bits to generate at least one data stream. The precoder 220 precodes the data stream. Precoding represents various MIMO pre-processes for transmitting data through multiple antennas, which will be explained later in more detail.

The signal generator 230 generates a time domain signal that will be transmitted through multiple transmit antennas 290-1 through 290-Nt. The signal generator 230 may generate the time domain signal processed by OFDMA (Orthogonal Frequency Division Multiple Access) system or SC-FDMA (Single Carrier-Frequency Division Multiple Access). The time domain signal output from the signal generator 230 is referred to as an SC-FDMA symbol or OFDMA symbol. The time domain signal is converted into a radio signal by an RF unit 240 and transmitted through the multiple antennas 290-1 through 290-Nt.

The RS generator 250 generates a RS. The RS is also referred to as a pilot and known to both a BS and a UE. The RS is used for data demodulation and/or channel estimation.

Figure 3:
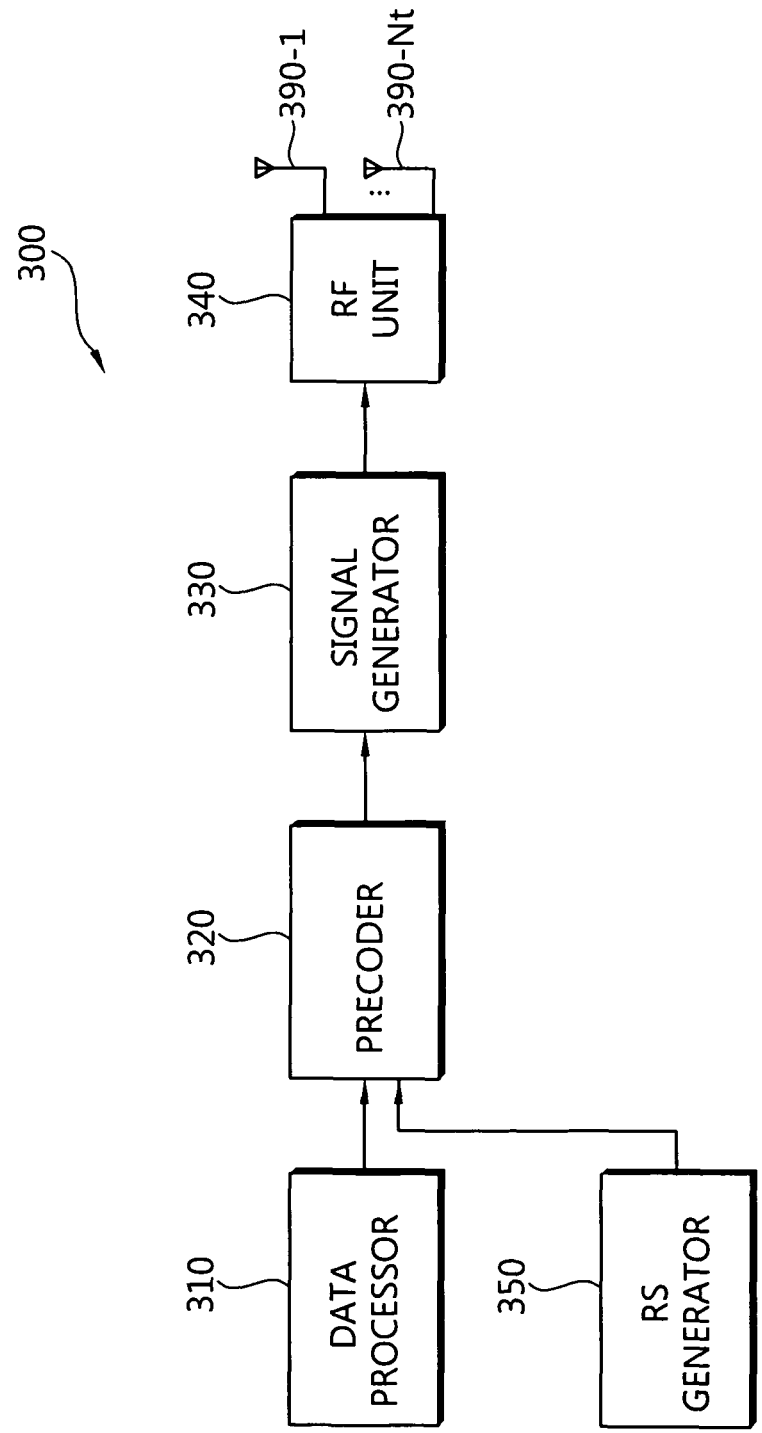
FIG. 3 is a block diagram of a transmitter having multiple transmit antennas according to another embodiment of the present invention.

FIG. 3 is a block diagram of a transmitter having multiple transmit antennas according to another embodiment of the present invention. Referring to FIG. 3, a transmitter 300 includes a data processor 310, a precoder 320, a signal generator 330 and a RS generator 340. The data processor 310 processes information bits to generate at least one data stream. The precoder 320 precodes the data stream. The signal generator 330 generates a time domain signal. The time domain signal is converted into a radio signal by an RF unit 340 and transmitted through multiple transmit antennas 390-1 through 390-Nt.

The RS generator 350 generates a precoded RS. The RS is input to the precoder, which is distinguished from the transmitter 200 illustrated in FIG. 2, precoded and transmitted. When the precoded RS is used, a receiver can obtain a precoded channel without having precoding information. However, signal carrier property may be deteriorated.

Hereinafter, a RS that is transmitted without being precoded is referred to as a non-precoded RS and a RS precoded is referred to as a precoded RS.

As well known in the art, OFDM (Orthogonal Frequency Division Multiplexing) uses a plurality of orthogonal subcarriers. OFDM uses orthogonality between IFFT (Inverse Fast Fourier Transform) and FFT (Fast Fourier Transform). A transmitter inverse-fast-Fourier-transforms data and transmits the inverse-fast-Fourier-transformed data. A receiver receives the signal from the transmitter and fast-Fourier-transforms the received signal to restore the original data. The transmitter uses IFFT to combine multiple subcarriers and the receiver uses FFT to split the multiple carriers. OFDMA is a multiple access method based on OFDM. OFDMA can allocate different subcarriers to multiple users to improve efficiency of radio resources.

Figure 4:
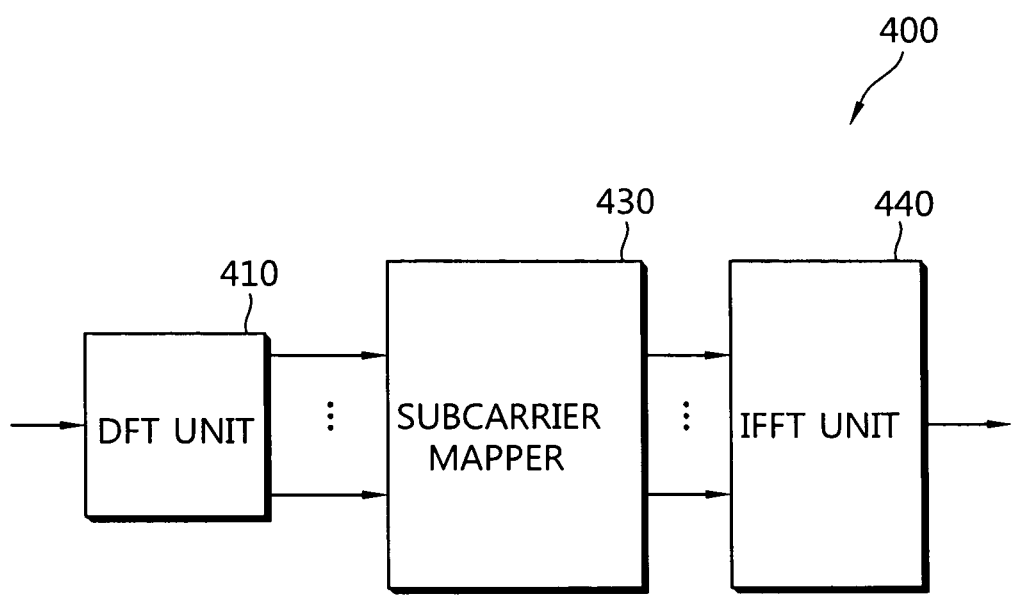
FIG. 4 is a block diagram of a signal generator according to SC-FDMA.

FIG. 4 is a block diagram of a signal generator according to SC-FDMA. SC-FDMA performs IFFT after DFT and may be called as DFT-s (DFT-spread) OFDM. A signal generator 400 includes a DFT (Discrete Fourier Transform) unit 410 that performs DFT, a subcarrier mapper 430 and an IFFT unit 440 that carries out IFFT. The DFT unit 410 discrete-Fourier-transforms input data and outputs frequency domain DFT symbols. The subcarrier mapper 430 maps the DFT symbols to subcarriers. The IFFT unit 440 inverse-fast-Fourier-transforms symbols input thereto and outputs a time domain signal.

SC-FDMA performs IFFT after DFT spreading, and thus SC-FDMA has single carrier property. In addition, SC-FDMA has PAPR (peak-to-average power ratio) lower than that of OFDMA.

Figure 5:
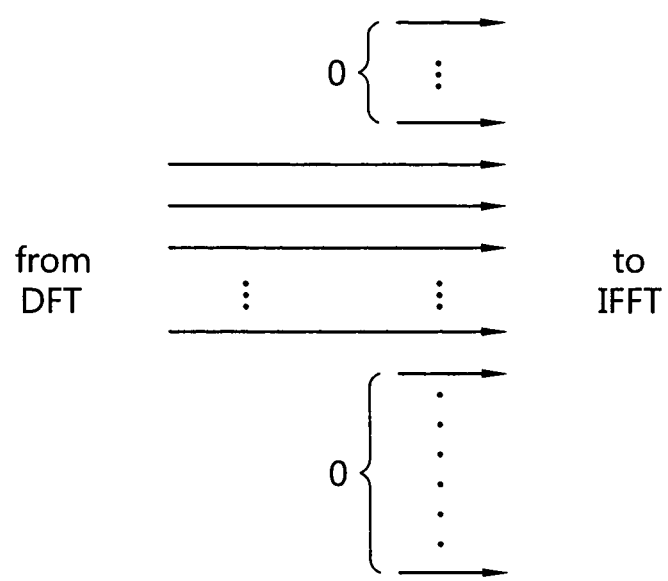
FIG. 5 shows an example of subcarrier mapping.

FIG. 5 shows an example of subcarrier mapping. DFT symbols from the DFT unit 410 are mapped to contiguous subcarriers. This is called as localized mapping.

Figure 6:
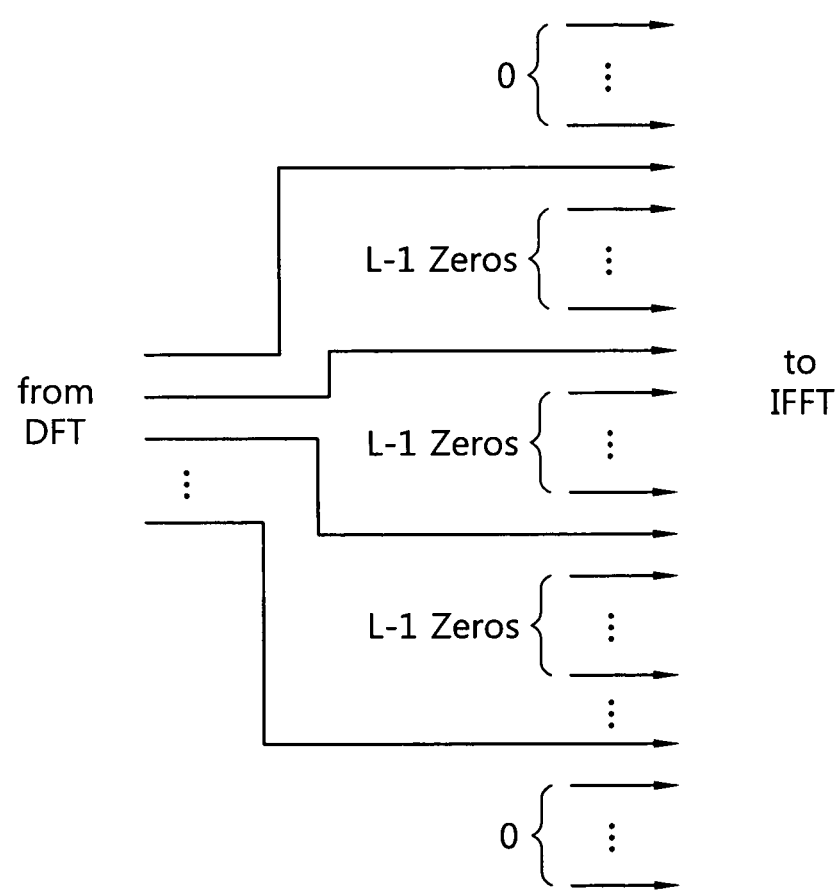
FIG. 6 shows another example of subcarrier mapping.

FIG. 6 shows another example of subcarrier mapping. DFT symbols from the DFT unit 410 are mapped to non-contiguous subcarriers. This is called as distributed mapping.

Figure 7:
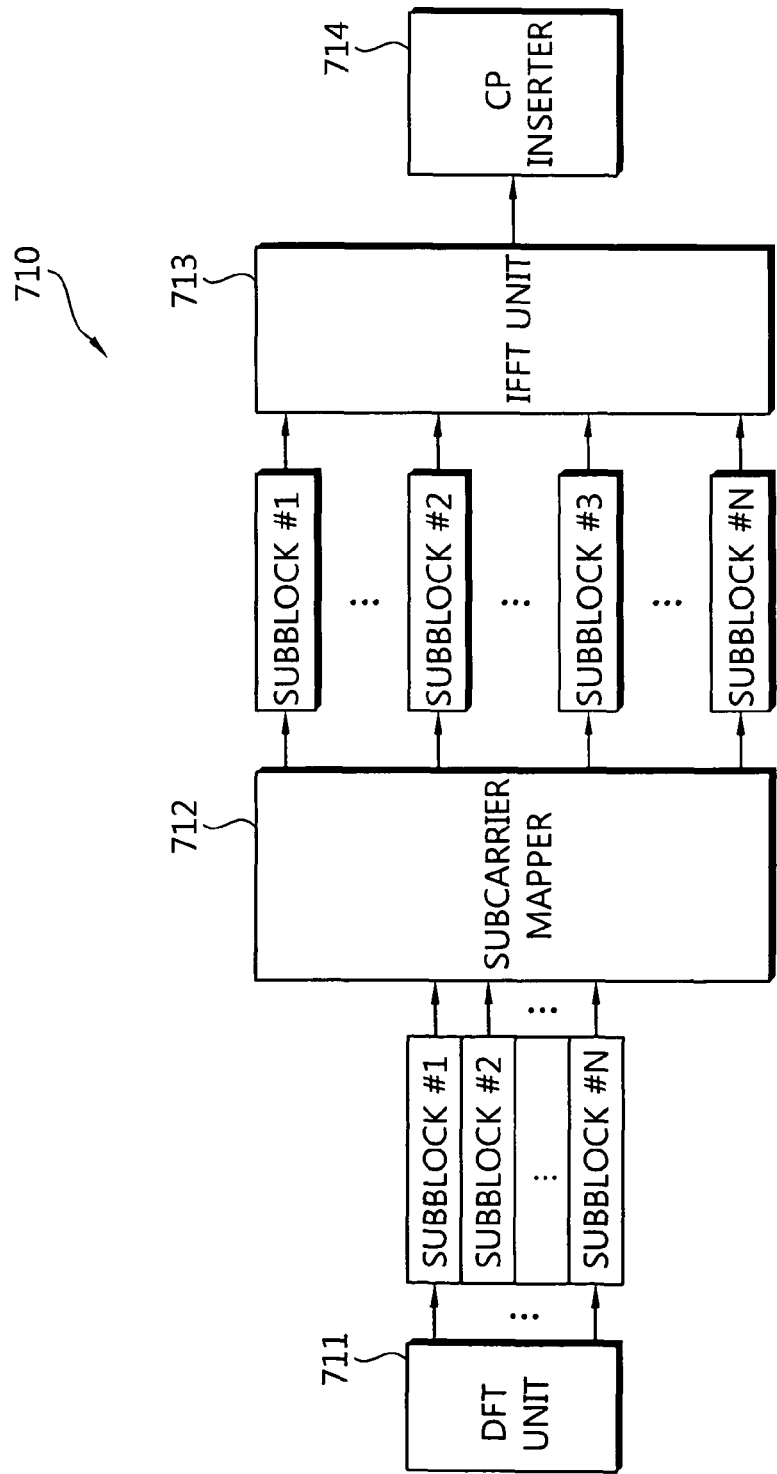
FIG. 7 shows a block diagram of a clustered SC-FDMA transmitter.

FIG. 7 shows a block diagram of a clustered SC-FDMA transmitter. A clustered SC-FDMA (or clustered DFT-s OFDM) processes DFT symbols in unit of a subblock. A transmitter 710 includes a DFT unit 711, a subcarrier mapper 712, a IFFT unit 713 and a CP inserter 714. DFT symbol outputted from the DFT unit 711 may be divided into N subblocks. N subblocks includes subblock #1, subblock #2, . . . , subblock #N. A subblock is a resource unit to map frequency domain symbols and/or time domain symbols into radio resources. Each subblock may be contiguous or non-contiguous. An amount of resources in each subblock may be same or different each other. The subcarrier mapper 712 maps the DFT symbols to subcarriers in unit of the subblock. Localized mapping or distributed mapping may be used. The IFFT unit 713 outputs a time domain signal by performing IFFT to the mapped subblocks. The CP inserter 714 inserts CP to the time domain signal.

The transmitter 710 may support a single carrier or multiple carrier. In single carrier system, N subblocks corresponds to the single carrier. In multiple carrier system, at least one subblock of the N subblocks corresponds to a carrier.

Figure 8:
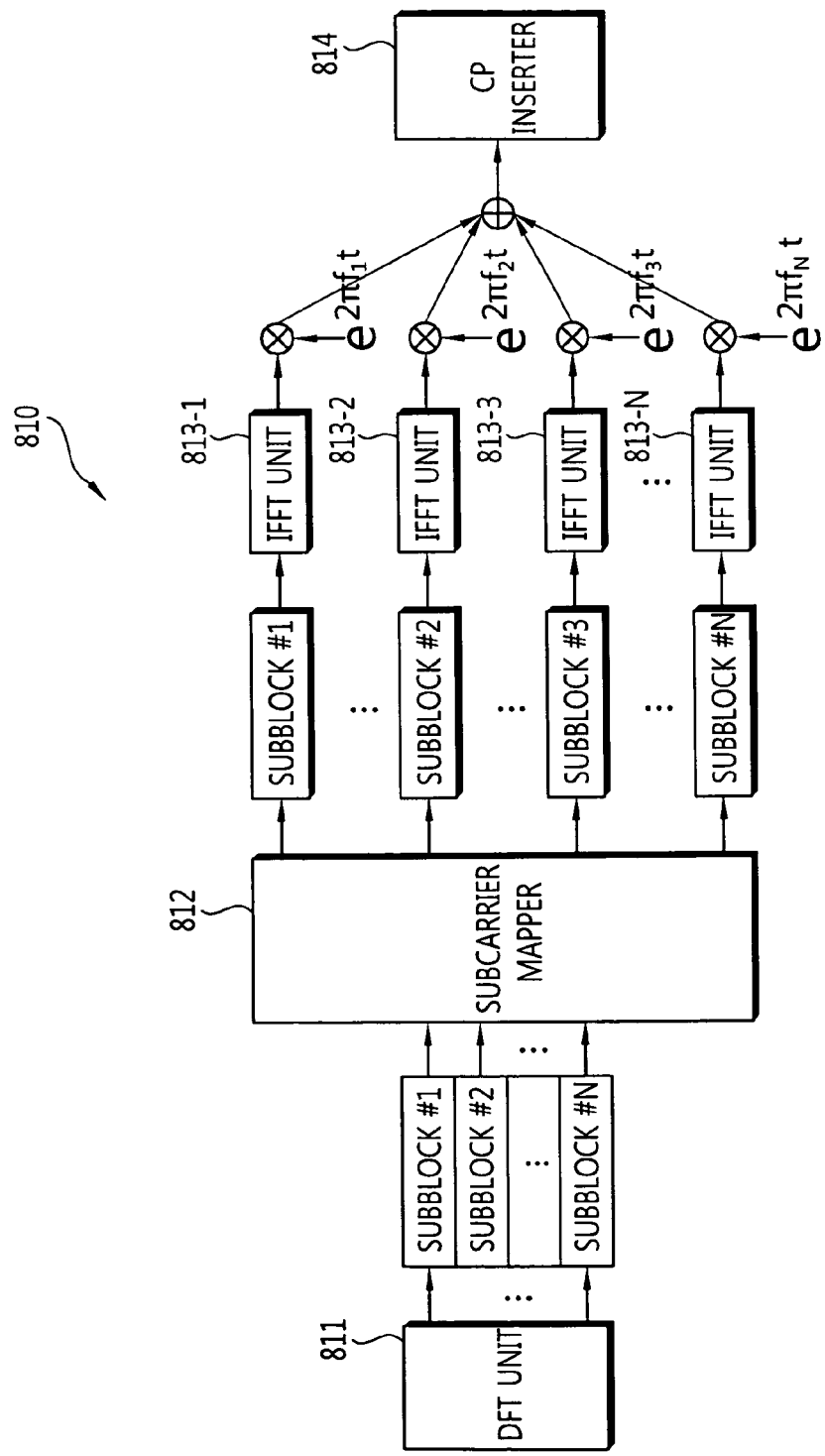
FIG. 8 shows a block diagram of an example of SC-FDMA transmitter supporting multiple carrier.

FIG. 8 shows a block diagram of an example of SC-FDMA transmitter supporting multiple carrier. A transmitter 810 includes a DFT unit 811, a subcarrier mapper 812, IFFT units from 813-1 to 813-N and a CP inserter 814. DFT symbol outputted from the DFT unit 811 may be divided into N subblocks. The subcarrier mapper 812 maps the DFT symbols to subcarriers in unit of the subblock. Localized mapping or distributed mapping may be used. IFFT is independently performed in each subblock. A n-th IFFT unit corresponded to a n-th subblock and outputs a n-th time domain signal. The n-th time domain signal is multiplied by n-th carrier. The CP inserter 814 inserts CP to the sum of N time domain signals. Each subblock corresponds to a carrier.

Figure 9:
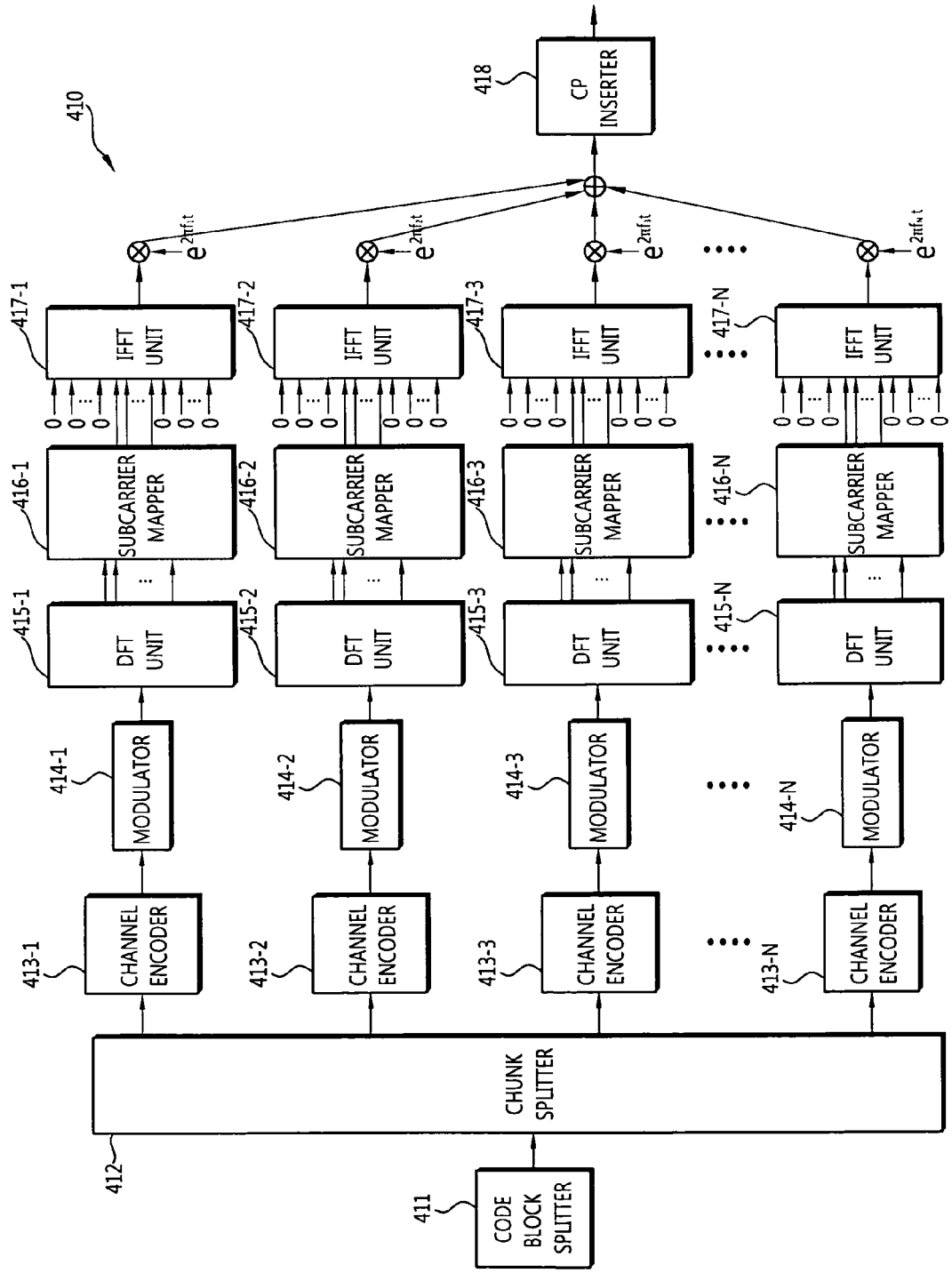
FIG. 9 shows a block diagram of another example of SC-FDMA transmitter supporting multiple carrier.

FIG. 9 shows a block diagram of another example of SC-FDMA transmitter supporting multiple carrier. This may be called as a chunk specific DFT-s OFDM or Nx SC-FDMA. A transmitter 910 includes a code block splitter 911, a chunk splitter 912, channel encoders from 913-1 to 913-N, modulators from 914-1 to 914-N, DFT units from 915-1 to 915-N, subcarrier mappers from 916-1 to 916-N, IFFT units from 917-1 to 917-N and a CP inserter 918. N corresponds to the number of carriers used by the transmitter 910. The code block splitter 911 divides a transport block into a plurality of code blocks. The chunk splitter 912 divides a code block into a plurality of chunks. A chunk is a data segment transmitted through one carrier selected from a plurality of carriers. DFT is performed in unit of chunk.

A frame structure of an LTE system disclosed in Clauses 4 and 5 of 3GPP TS 36.211 V8.2.0 (2008-03) "Technical Specification Group Radio Access Network; Evolved Universal Terrestrial Radio Access (E-UTRA) Physical Channels and Modulation (Release 8)" will now be described.

Figure 10:
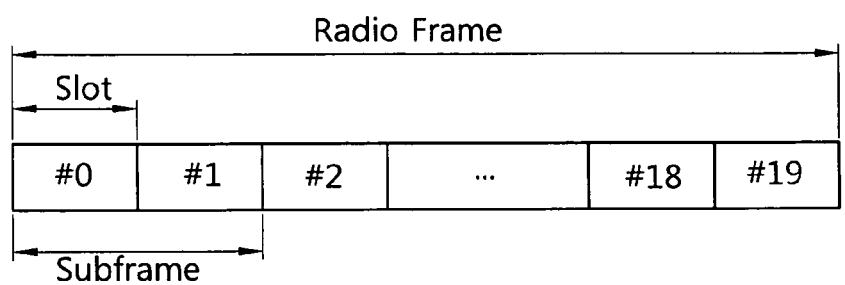
FIG. 10 illustrates a structure of a radio frame.

FIG. 10 illustrates a structure of a radio frame. A radio frame includes 10 subframes and a subframe is composed of two slots in time domain. A time required to transmit a single subframe is defined as a TTI (Transmission Time Interval). For example, a signal subframe may have a length of 1 ms and a single slot may have a length of 0.5 ms. A slot includes a plurality of OFDMA symbols (or SC-FDMA symbols) in time domain and includes a plurality of resource blocks in frequency domain.

The above-described radio frame structure is exemplary and the number of subframes included in the radio frame, the number of slots included in a single subframe and the number of OFDMA symbols included in a single slot may be varied.

Figure 11:
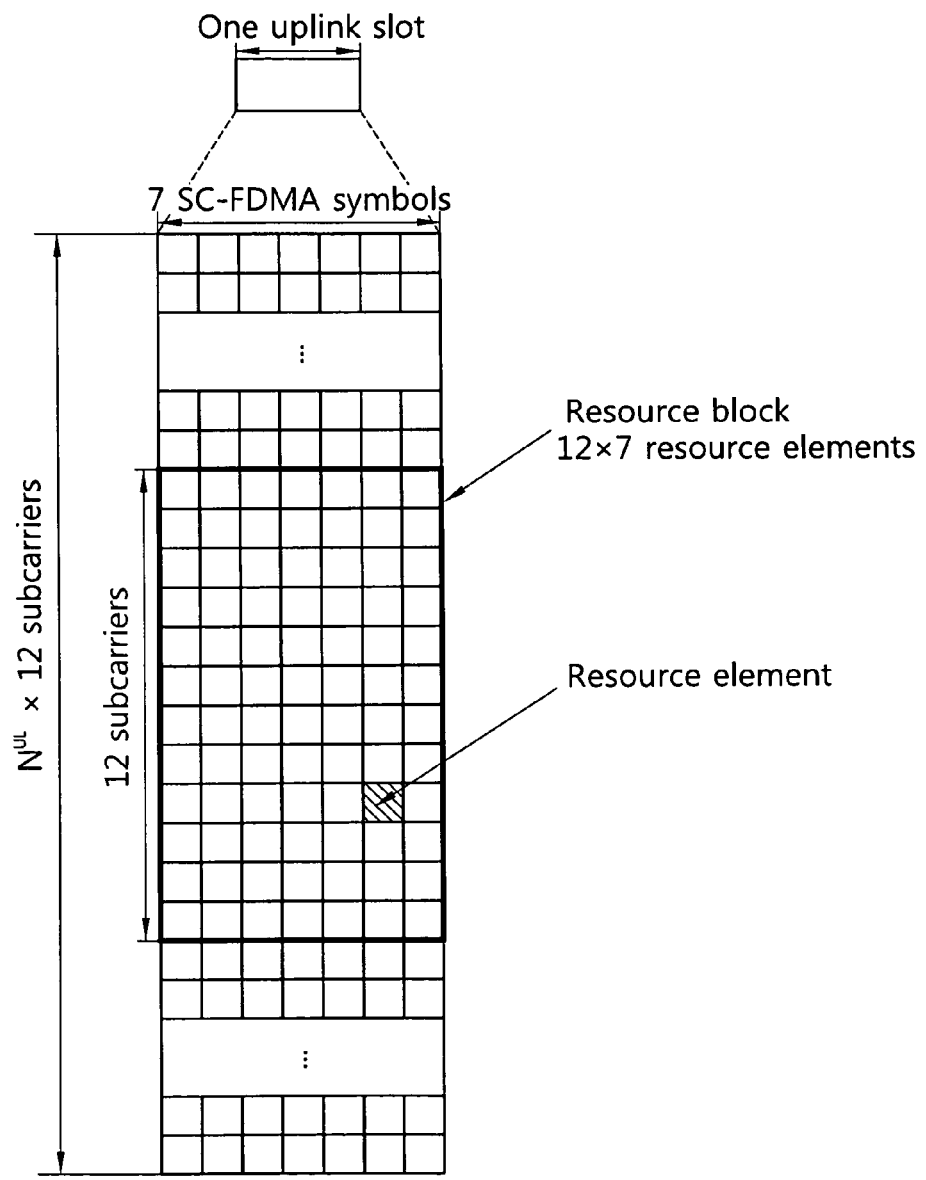
FIG. 11 illustrates a resource grid with respect to a single uplink slot.

FIG. 11 illustrates a resource grid with respect to a single uplink slot. An uplink slot includes a plurality of SC-FDMA symbols in time domain and includes a plurality of resource blocks in frequency domain. An uplink slot includes 7 SC-FDMA symbols and a resource block includes 12 subcarriers. However, the number of SC-FDMA symbols and the number of subcarriers are not limited thereto.

Each element on the resource grid is referred to as a resource element and a single resource block includes 12×7 resource elements. The number $N^{UL}$ of resource blocks included in an uplink slot depends on an uplink transmission bandwidth set in a cell.

Figure 12:
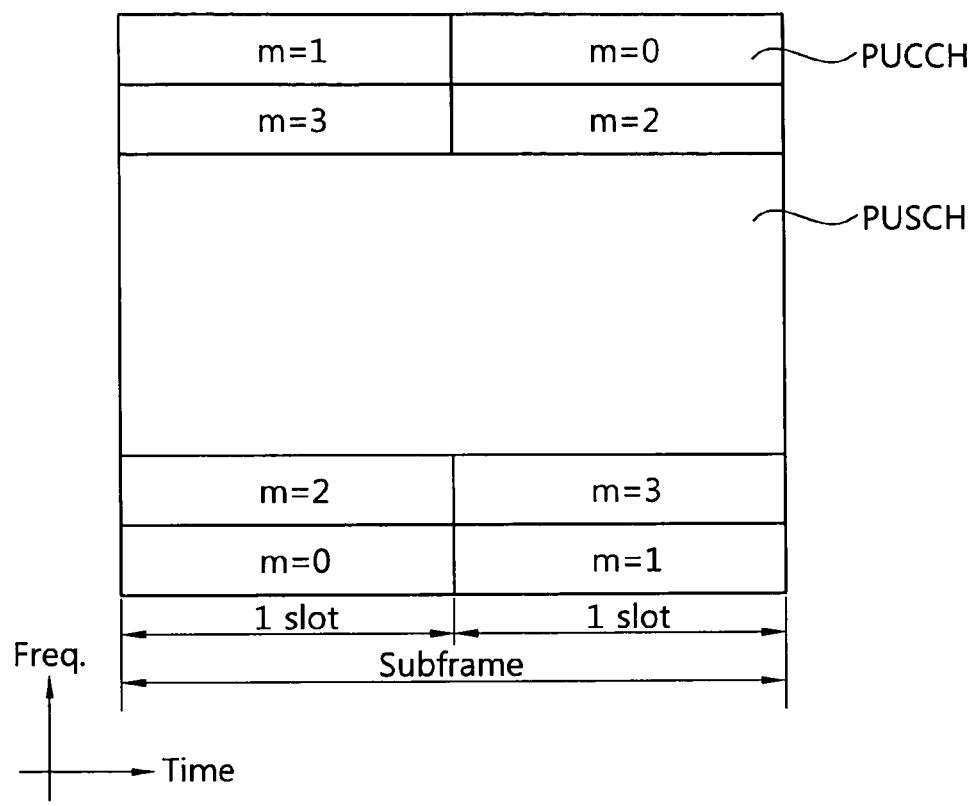
FIG. 12 illustrates a structure of an uplink subframe.

FIG. 12 illustrates a structure of an uplink subframe. The uplink subframe may be divided into a control region to which PUCCH (Physical Uplink Control Channel) carrying uplink control information is allocated and a data region to which PUSCH (Physical Uplink Shared Channel) carrying data streams is allocated. The middle part of the uplink subframe, which corresponds to the data region, is allocated to the PUSCH and parts on both sides of the uplink subframe are allocated to the PUCCH. The uplink control information transmitted on the PUCCH includes ACK (Acknowledgement)/NACK (Not-acknowledgement) signal used to perform HARQ (Hybrid Automatic Repeat Request), CQI (Channel Quality Indicator) that indicates downlink channel condition, a scheduling request signal for requesting an uplink radio resource, etc. The uplink control information can be transmitted on the PUSCH as well as the PUCCH.

PUSCH is mapped to an UL-SCH (Uplink Shared Channel) corresponding to a transport channel and carries data streams and/or the uplink control information.

PUCCH for a single UE uses a single resource block that occupies different frequencies in two slots in the subframe. The two slots use different resource blocks (or subcarriers) in the subframe. Two resource blocks allocated to the PUCCH are frequency-hopped at the slot boundary. FIG. 7 exemplifies allocation of PUCCH with m=0, PUCCH with m=1, PUCCH with m=2 and PUCCH with m=3 for four UEs to the subframe.

Figure 13:
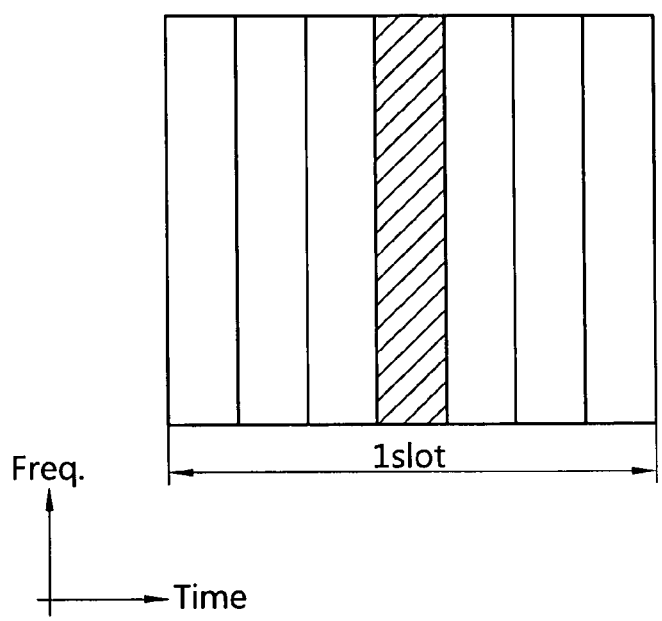
FIG. 13 illustrates transmission of a RS for PUSCH.

FIG. 13 illustrates transmission of a RS for PUSCH. The RS is transmitted in the fourth SC-FDMA symbol (that is, the SC-FDMA symbol located at the center of a slot) in a single slot. To maintain single carrier property, a single entire SC-FDMA symbol is used to transmit the RS.

Although a multiple access system to which the present invention may be applied is not limited, SC-FDMA or OFDMA systems will exemplarily be described for clarity. Furthermore, an OFDMA symbol represents a time domain signal processed according to various multiple access methods, for example, SC-FDMA or OFDMA, and the OFDMA symbol is not limited to a time domain signal processed according to OFDMA.

RS design will now be described.

A sequence with high correlation property can be used as a base sequence for a RS. For example, CAZAC (Constant Amplitude Zero Auto-Correlation) sequence may be used as a RS sequence.

The CAZAC sequence includes a ZC (Zadoff Chu) sequence. A ZC sequence c(k) having a length of N is obtained by:

$$c(k) = \begin{cases} e^{-j\frac{\pi Mk(k+1)}{N}} & \text{for odd } N \\ e^{-j\frac{\pi Mk^2}{N}} & \text{for even } N \end{cases} \quad \text{[Equation 5]}$$

where $0 \leq k \leq N-1$, M denotes a root index and is a natural number equal to or smaller than N. M is relatively prime of N. That is, when N is determined, the number of root indexes corresponds to the number of available root ZC sequences.

ZC sequences are orthogonal when having the same root index and different cyclic shift values. Furthermore, ZC sequences having different root indexes have a specific low cross-correlation value. Accordingly, in a general case in which no great users share the same resource block, a unique cyclic shift value is allocated to each UE in order to assign a unique RS to each UE.

The MIMO system can support various MIMO transport modes. For example, MIMO transport modes include SU-MIMO, beamforming, CDD (Cyclic Delay Diversity), STBC (Space Time Block Code), SFBC (Space Frequency Block Code), block-STBC, block-SFBC, antenna switching and antenna selection, etc. The MIMO system can simultaneously transmit at least one data stream through multiple transmit antennas. A rank represents the number of data streams that can be simultaneously transmitted. Furthermore, the rank corresponds to the number of available independent MIMO channels or the number of available transmission layers.

The SU-MIMO is a method that performs pre-processing using a precoding matrix (or weight matrix) or a precoding vector (or weight vector) for data transmission through multiple transmit antennas. The SU-MIMO provides SDM (Spatial Division Multiplexing) of multiple data streams (or data symbols) to a single UE using the same time-frequency(-code) resources. The MU-MIMO provides SDM of multiple data streams (or data symbols) to different UEs using the same time-frequency(-code) resources.

The CDD cyclically delays a single data stream (or data symbol) and transmits the single data stream through multiple transmit antennas. The CDD can cyclically delay a time domain signal or cyclically shift a phase of a frequency domain signal.

The STBC is for obtaining space-time diversity. Table 1 represents STBC for two typical transmit antennas for a data symbol $X_n$ to which Alamouti's code is applied.

TABLE 1

|  | Transmit antenna 1 | Transmit antenna 2 |
|---|---|---|
| Time n | $x_n$ | $-x^*_{n+1}$ |
| Time n + 1 | $x_{n+1}$ | $x^*_n$ |

Here, $x^*_n$ represents complex conjugate of $x_n$.

The SFBC is for obtaining space-frequency diversity. The SFBC uses neighboring frequencies while the STBC uses neighboring time zones. Table 2 represents SFBC for two typical transmit antennas for a data symbol $x_n$.

TABLE 2

|  | Transmit antenna 1 | Transmit antenna 2 |
|---|---|---|
| Subcarrier n | $x_n$ | $-x^*_{n+1}$ |
| subcarrier n + 1 | $x_{n+1}$ | $x^*_n$ |

The block-STBC is for obtaining the same space-time diversity as that of the STBC in SC-FDMA transmission and is designed to maintain a low PAPR and facilitate decoding of STBC in the frequency domain.

Figure 14:
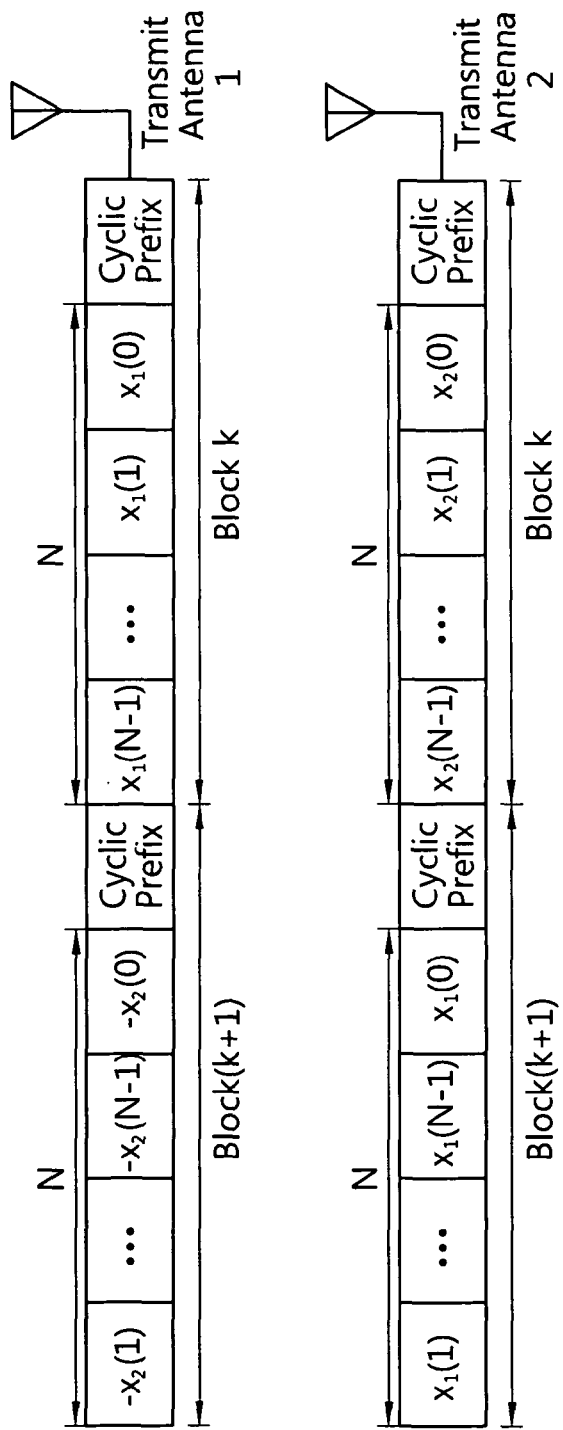
FIG. 14 illustrates transmission of block-STBC for two transmit antennas.

FIG. 14 illustrates transmission of block-STBC for two transmit antennas. A single block is transmitted in a single SC-FDMA symbol and N symbols and CP (Cyclic Prefix) construct a single block. It is assumed that a k-th block through an i-th transmit antenna is $x^{(k)}_i$ and an n-th symbol of $x^{(k)}_i$ is $x^{(k)}_i(n)$ ($0 \leq n \leq N-1$). A pair of blocks $x^{(k)}_1$ and $x^{(k)}_2$ having a length of N is transmitted for each of SC-FDMA symbols with K=0, 2, 4, . . . . Similarly to STBC, the complex conjugate of $x^{(k)}_i$ is transmitted in the (k+1)th SC-FDMA symbol and the positions of symbols other than the symbol $x_i(0)$ are reversed while the position of the symbol $x_i(0)$ is maintained. That is, $x^{(k+1)}_1(n) = -x^{*(k)}_2(-n \mod N)$ and $x^{(k+1)}_2(n) = -x^{*(k)}_1(-n \mod N)$ (n=0, 1, . . . , N-1, k=0, 2, 4, . . . ). Here, x* represents the complex conjugate of x and 'mod' represents modulo operation. Table 3 represents the transmission of block-STBC for two transmit antennas.

TABLE 3

|  | Transmit antenna 1 | Transmit antenna 2 |
|---|---|---|
| k-th SC-FDMA symbol | $x^{(k)}_1(n)$ | $x^{(k)}_2(n)$ |
| (k + 1)th SC-FDMA symbol | $-x^{*(k)}_2(-n \mod N)$ | $x^{*(k)}_1(-n \mod N)$ |

Though the block-STBC for two transmit antennas is described, those skilled in art can easily apply to the block-STBC for multiple transmit antennas.

The block-STBC can be transformed into the form of block-SFBC, which is similar to the STBC transformed into SFBC. That is, the block-STBC transmits neighboring SC-FDMA symbols (or OFDMA symbols) block by block while the block-SFBC transmits neighboring resource blocks block by block. For example, the block-SFBC for a resource block including N subcarriers can be represented as follows.

TABLE 4

|  | Transmit antenna 1 | Transmit antenna 2 |
|---|---|---|
| k-th resource block | $x^{(k)}_1(n)$ | $x^{(k)}_2(n)$ |
| (k + 1)-th resource block | $-x^{*(k)}_2(-n \mod N)$ | $x^{*(k)}_1(-n \mod N)$ |

Here, n = 0, 1, . . . , N − 1.

The aforementioned MIMO transport modes are exemplary and the MIMO transport modes can be independently used or combined and used. For example, an MIMO transport mode corresponding to a combination of CDD and precoding can be used.

Next, various techniques for designing uplink RSs supporting various MIMO transport modes such as SU-MIMO, beamforming, CDD, STBC, SFBC, block-STBC, block-SFBC, antenna switching and antenna selection are proposed.

First of all, options according to each MIMO transport mode are considered.

I. RS Design for Each Uplink MIMO Transport Mode

I-1. Uplink SU-MIMO mode having a rank higher than 1.

An uplink SU-MIMO mode having a rank higher than 1, in which multiple data streams can be transmitted, is considered. An available precoding matrix may be selected by a UE or allocated by a BS. In both cases, the UE is required to transmit a RS for demodulation of the multiple data streams.

A 'precoded RS' represents a RS precoded using the same precoding matrix used for data stream transmission. The PAPR of the precoded RS may increase due to a combination of a RS sequence and the precoding matrix. The precoded RS may also be referred to as a dedicated pilot or a user-specific RS. A receiver can directly obtain a precoded channel through the precoded RS without having information on a precoding matrix and use the precoded channel for data demodulation. When the precoded RS is used, there is no need to transmit information on a precoding matrix used by a UE (transmitter) to a BS (receiver). However, this advantage of the precoded RS becomes insignificant when a precoding matrix to be used by the UE is indicated by the BS. Moreover, the precoded RS allows a number of RSs, which is smaller than the number of transmit antennas, to be transmitted to estimate channel status required for the BS (receiver) when the number of transmit antennas used for the UE (transmitter) is smaller than the number of transport data streams.

A 'non-precoded RS' represents a RS that is not precoded in order to maintain a low PAPR. The non-precoded RS may also be referred to as a common RS. Here, the non-precoded RS can use boosted power for data streams in order to improve channel estimation performance. If the non-precoded RS is used and the precoding matrix is applied to multiple data streams, the BS is required to estimate a precoded channel by using both the RS and information on the used precoding matrix.

SDMA can be applied even when some of UEs operate in the SU-MIMO mode. In SC-FDMA transmission, selection of a precoder may be restricted such that an identity matrix or a permutated matrix of the identity matrix is used for transmission of SU-MIMO having a rank greater than 1 in order to prevent PAPR from increasing.

I-2. Uplink SU-MIMO Mode Having Rank of 1

An uplink SU-MIMO mode (also referred to as an uplink beamforming mode) having a rank of 1 is considered. In the uplink SU-MIMO mode having a rank of 1, a precoding vector is applied to the transmission of a single data stream. A 'precoded RS' represents a RS precoded using the same precoding vector used for data stream transmission. In the case of the precoded RS, only a single RS can be allocated to a UE, and thus the precoded RS has an advantage in terms of RS resources. A 'non-precoded RS' represents a RS that is not precoded, and a UE transmits independent RSs from all the transmit antennas used for signal transmission. The BS estimates a precoded channel by using both the RS and information on a used precoding vector. If multiple UEs simultaneously transmit signals by using SDMA and some of the multiple UEs transmit signals in the SU-MIMO mode, the method using the non-precoded RS may undergo lack of available RSs.

1-3. Uplink CDD Mode

A 'CCD adapted RS' or 'CCD-non-adapted RS' may be considered. The CCD-adapted RS represents a RS to which the same cyclic delay used for data stream transmission is applied. The CCD-non-adapted RS represents a non-cyclic-delayed RS. The BS estimates a channel to which CDD is applied by using the RS and information on the used cyclic delay. CDD does not affect PAPR, and thus CDD can be easily applied to transmission diversity for SC-FDMA based uplink transmission. Even if some of UEs use CDD, SDMA can be applied.

I-4. Block-STBC

Although general SFBC has a high space diversity gain when OFDMA transmission is used, the SFBC increases PAPR in SC-FDMA base uplink and thus SFBC may not suitable for the SC-FDMA base uplink. In general STBC applied to two neighboring time sample units, space code decoding in the frequency domain is difficult to perform. Accordingly, the block-STBC applied to two neighboring SC-FDMA symbols may be most suitable for securing a low PAPR through SC-FDMA and easiness of space code decoding in the frequency domain while obtaining similar diversity gain.

It is required to allocate multiple RSs to a single UE for SFBC, STBC, block-STBC and block SFBC.

I-5. Antenna Switching/Selection

In antenna selection or switching based on transmit diversity, a RS corresponding to a transmit antenna is allocated to each UE. The RS may be used to estimate a channel corresponding to the transmit antenna.

For clarity, 'precoding' represents various MIMO pre-processing required for data transmission using multiple transmit antennas and includes SU-MIMO, beamforming, CDD, SFBC, STBC, block-STBC and block-SFBC. Accordingly, precoding information represents information used for pre-coding, for example, information on a precoding matrix (or precoding vector) in SU-MIMO and a cyclic delay value in CDD. Furthermore, a precoded RS represents a RS to which one of a precoding matrix, a precoding vector and/or CDD cyclic delay is applied. 'Transmit diversity' represents transmission of a single data stream through multiple antennas and includes SU-MIMO, CDD, SFBC, STBC, block-STBC and block-SFBC which have a rank of 1.

II. RS Design for Uplink MIMO Transmission Based on SC-FDMA

A RS is designed to support MIMO transmission while maintaining compatibility with the existing LTE system. Furthermore, RS design is performed in such a manner that SDMA using single carrier property is supported to minimize PAPR.

II-1. First Embodiment

If multiple data streams are transmitted on PUSCH, each transmit antenna requires a RS. Accordingly, multiple RSs must be allocated to a single UE. Allocation of as many RSs as the number of transmit antennas irrespective of a rank can be considered as a RS allocation method. As many non-precoded RSs as the number of transmit antennas are allocated to each UE. For example, if a ZC sequence is used as a RS sequence, two cyclic shift values of the ZC sequence may be allocated to a UE using two transmit antennas for RSs. A BS may generate a precoded channel by using non-precoded RSs and information on precoding. Here, the BS needs to know precoding information (for example, precoding matrix, precoding vector, CCD cyclic delay value, etc.). The precoding information may be previously determined, defined such that the precoding information is changed according to a determined rule or allocated by the BS to a UE through an RRC (Radio Resource Control) message or a dynamic control channel such as a PDCCH (Physical Downlink Control Channel). Exceptionally, when a UE voluntarily selects precoding information by using reciprocity of uplink and downlink in a TDD system, it is required to transmit used precoding information from the UE to the BS.

The BS allocates a plurality of RSs to a UE through various methods. The BS can allocate the plurality of RSs through explicit or implicit signaling. For example, if multiple cyclic shift values of a ZC sequence are allocated, an allocation rule can be determined such that a minimum difference value of the allocated cyclic shift values is maximized (or minimized).

For an example, if the BS allocates multiple cyclic shifts to a UE in order to assign multiple RSs for multiple transmit antennas, the BS can transmit only a single cyclic shift to the UE for a single transmit antenna. The single cyclic shift can be transmitted through PDCCH or RRC message. The UE can derive cyclic shifts with respect to other transmit antennas according to a specific rule. For example, if a set of available cyclic shifts is $\{0, 1, 2, 3, 4, 5, 6, 7\}$ and the UE uses two transmit antennas, the UE can set the cyclic shift of a RS for the second transmit antenna to '3' when '2' is allocated to the UE as the cyclic shift of a RS for the first transmit antenna. Furthermore, a sufficiently large cyclic shift interval is advantageous to channel estimation because the sufficiently large cyclic shift interval minimizes interference in a multi-path channel, and thus $\{(0, 4), (1, 5), (2, 6), (3, 7)\}$ can be set as available cyclic shift pairs. Accordingly, when a single cyclic shift is allocated to the UE having the two transmit antennas, the UE can use both cyclic shift values of the cyclic shift pair that has the single cyclic shift allocated to the UE.

For another example, the BS can allocate all of cyclic shifts with respect to multiple RSs to the UE. Here, if a 3-bit cyclic shift is used, bits corresponding to "3×the number of transmit antennas" are required to transmit all the cyclic shifts. The number of bits may be reduced by restricting available cyclic shift pairs in advance.

II-2. Second Embodiment

A single precoded RS is used if a rank is 1 and a plurality of non-precoded RSs that are identified using different cyclic shifts are used if the rank is greater than 1. As described above, a precoded RS may cause an increase in PAPR when two or more streams are transmitted, and thus the precoded RS is used only for transmission of a single data stream to maintain the advantage of SC-FDMA and apply boosting power of the RS.

If a UE uses transmit diversity based on SU-MIMO or CDD which has a rank of 1, a single precoded RS is allocated. A BS can directly obtain a precoded channel from the precoded RS.

When SU-MIMO or block-STBC having a rank higher than 1 is used, multiple non-precoded RSs are allocated to the UE because PAPR may increase if a precoded RS is used. The BS can obtain a channel by using the non-precoded RSs and precoding information. The various methods described in clause II-1 can be used to allocate multiple RSs.

In SC-FDMA transmission, if a single precoding matrix over wideband is employed, cubic metric (CM) may be increased when different layers are mixed together into transmit anntenas. That means rank 1 transmissions do not necessarily cause to increase the CM. On the other hand, rank 2 or higher result in problems in terms of CM. So from that point of view, it is beneficial to use precoded RS for a rank 1 transmission because it would be possible to get both beamforming gain and at the same time low CM transmission. When the rank is higher than 1, the utilization of the precoded RS can increase CM. When the rank is higher than 1, it would be beneficial to use non-precoded RS so that we may have more opportunity to adjust power, which is obtained from low CM property. From this point, it can be referred to as switching method between precoded RS and non-precoded RS according to rank and possibly other criteria. When the rank is set to 1, the precoded RS is used. When the rank is higher than 1, the non-precoded RS is used.

For uplink MIMO, given limited power needs to be shared between layers or antenna ports. More number of layers/antenna ports can result in performance degradation because of assigning less power allocation to each layer/antenna port. As a result, a non-precoded RS can provide more rooms to use power efficiently in terms of CM. As one example, assume that the number of transmit antennas is 4. If transmission rank is lower than a threshold value less than 4, a precoded RS is transmitted. Otherwise, a non-precoded RS is transmitted. The threshold value may be pre-determined or configured by a BS. If it is configurable, it may be signaled by higher layer signaling such as a RRC message.

For open loop spatial multiplexing with precoding matrix cycling/switching per a OFDMA symbol the precoding matrix is changed every symbol so the RS may be transmitted in non-precoded manner. When the precoding matrix is changed every multiple OFDMA symbols such as every slot, the RS may be transmitted in precoded manner on the condition that precoded data would be demodulated relying on the RS in the slot. For lower rank (e.g, rank 1 or rank 2 assuming 4 transmit antennas), a precoded RS may show good performance. This is because each antenna only transmits a fraction of the total transmit power, but the channel estimation performance may be degraded compared with non-precoded RS transmission. However, for higher rank (e.g, rank 3 or rank 4 assuming 4 transmit antennas) transmissions, the non-precoded RS transmission may show good performance. This is because the power difference between one of power used for each precoded RS and non-precoded RS is smaller for higher rank transmissions. This would reduce the channel estimation performance gap between precoded and non-precoded RS and by allowing the ability to use time interpolation of non-precoded RS between slots, the non-precoded RS may have better performance. Especially for the case of rank 4, the performance using the non-precoded RS may outperform that using the precoded RS.

For Rank 1 and Rank 2, the slot level precoding matrix cycling/switching with precoded DRS has shows better performance than symbol level precoding matrix cycling with non-precoded for non-channel dependent spatial multiplexing. We propose that while the slot level precoding matrix cycling with precoded DRS can be used for lower rank, the symbol level precoding matrix cycling with non-precoded DRS can be applied to higher rank such as rank 3-4 transmission. Then we can obtain some potential gain of channel estimation from interpolation of two non-precoded RS within a subframe. Here over than rank 2 is just for example so it is not necessary to limit a rank as a switching point.

The non-channel dependent spatial multiplexing mode may use transmit diversity scheme in case the channel quality only supports rank 1 and spatial multiplexing of data in rank 2 or above. In this case the transmit diversity scheme may require multiple RS (such as 2) in order to achieve diversity for data. If we assume the switch between using precoded RS and non-precoded RS occurs at rank equal to 3, then the number of RS used for each channel rank would be 2, 2, 4, and 4 for each rank 1, 2, 3, and 4 respectively.

So far there is a general understanding that for uplink SU-MIMO based on SC-FDMA the wideband precoding can be applied to prevent the unnecessary increase of CM. But if we consider the non-contiguous RB allocation such as clustered SC-FDMA to provide scheduling flexibility, it may be beneficial to use subband precoding. The subband precoding may include different precoding matrices or vectors in different subblocks. Additionally, transmission rank of each subblock may be different. When considering CM, same precoding matrix or vector within one subblock may be desirable. On the other hand, this subband precoding may cause increase in terms of CM. But MIMO transmission with SC-FDMA, a given power needs to be shared between layers or antenna ports. That means more number of layers/antenna ports can result in performance degradation because of assigning less power allocation to each layer/antenna port. In this case, RS power boosting may be required for reliable channel estimation. That is, if subband precoding is applied, a non-precoded RS may be beneficial because the non-precoded RS can provide more rooms to use power efficiently in terms of CM. We provide two switching operation examples. First, if subband precoding is used, a non-precoded RS may be used. Otherwise, a precoded RS may be used. Second, if subband precoding is used and a rank is higher than a threshold value, the non-precoded RS may be used. Otherwise, the precoded RS may be used. The threshold value may be a fixed value or configured by higher layer signaling.

II-3. Third Embodiment

In transmit diversity based on SU-MIMI or CDD having a rank of 1, a single precoded RS is used. A BS can directly obtain a channel through the precoded RS.

When SU-MIMI or block-STBC having a rank greater than 1 is used, a plurality of non-precoded RSs are used. A RS for SU-MIMP having a rank greater than 1 is not precoded because low PAPR is maintained and power boosting of the RS is obtained. Here, a plurality of time domain symbols (for example, OFDMA symbols) are allocated as RSs. In this case, a single cyclic shift may be allocated, which is distinguished from the second embodiment. RSs for respective streams (or layers) can be identified according to time domain orthogonalization or both the time domain orthogonalization and code domain orthogonalization. The code domain orthogonalization can be obtained according to orthogonal covering, that is, different cyclic shifts, Walsh code, DFT matrix and a combination thereof.

FIG. 15 illustrates an example of allocation of two OFDMA symbols to a RS in a slot and FIG. 16 illustrates another example of allocation of two OFDMA symbols to a RS in a slot. FIG. 15 shows that the same RS (for example, same cyclic shift) is used for two RS OFDMA symbols and FIG. 16 shows that different RSs (for example, different cyclic shifts) are used for two reference OFDMA symbols. The two RS OFDMA symbols can be orthogonalized into the code domain. For example, the two RS OFDMA symbols can be orthogonalized according to orthogonal sequences {1, 1} and {1, −1}. If three RS OFDMA symbols are used, the RS OFDMA symbols can be orthogonalized according to at least one of orthogonal sequences {1, 1, 1}, {1, $e^{j2\pi/3}$, $e^{j4\pi/3}$} and {1, $e^{j4\pi/3}$, $e^{j2\pi/3}$}. Though two OFDMA symbols that are not adjacent to each other are allocated to a RS in a single slot including 7 OFDMA symbols in the current embodiment of the present invention, the number of multiple RS symbols is not limited thereto. The multiple RS symbols can be allocated subframe by subframe as well as slot by slot and can be allocated to multiple neighboring OFDMA symbols.

It is efficient to use the same RS for a plurality of RS OFDMA symbols for a given transmit antenna in terms of code allocation. Otherwise, it is advantageous to use different RSs for a plurality of RS OFDMA symbols in order to mitigate interference.

As described above, in the uplink transmission based on SC-FDMA, a precoded RS or a non-precoded RS can be used according to MIMO transmission mode. A UE can use one of the precoded RS and the non-precoded RS all the time or select one of the precoded RS and the non-precoded RS. Furthermore, the above-described three embodiments can be combined.

III. RS Design for SC-FDMA/FODMA Hybrid System

Some of uplink transmission modes use OFDMA in which PAPR restriction is alleviated and other modes require RS design and operation for a case using SC-FDMA. Since OFDMA has high frequency efficiency although SC-FDMA has satisfactory PAPR characteristic, the peak data rate can be improved if OFDMA is selectively used in addition to SC-FDMA for uplink transmission. For example, OFDMA is used for precoding with a rank greater than 1 and SC-FDMA is used for antenna selection/switching.

Figure 17:
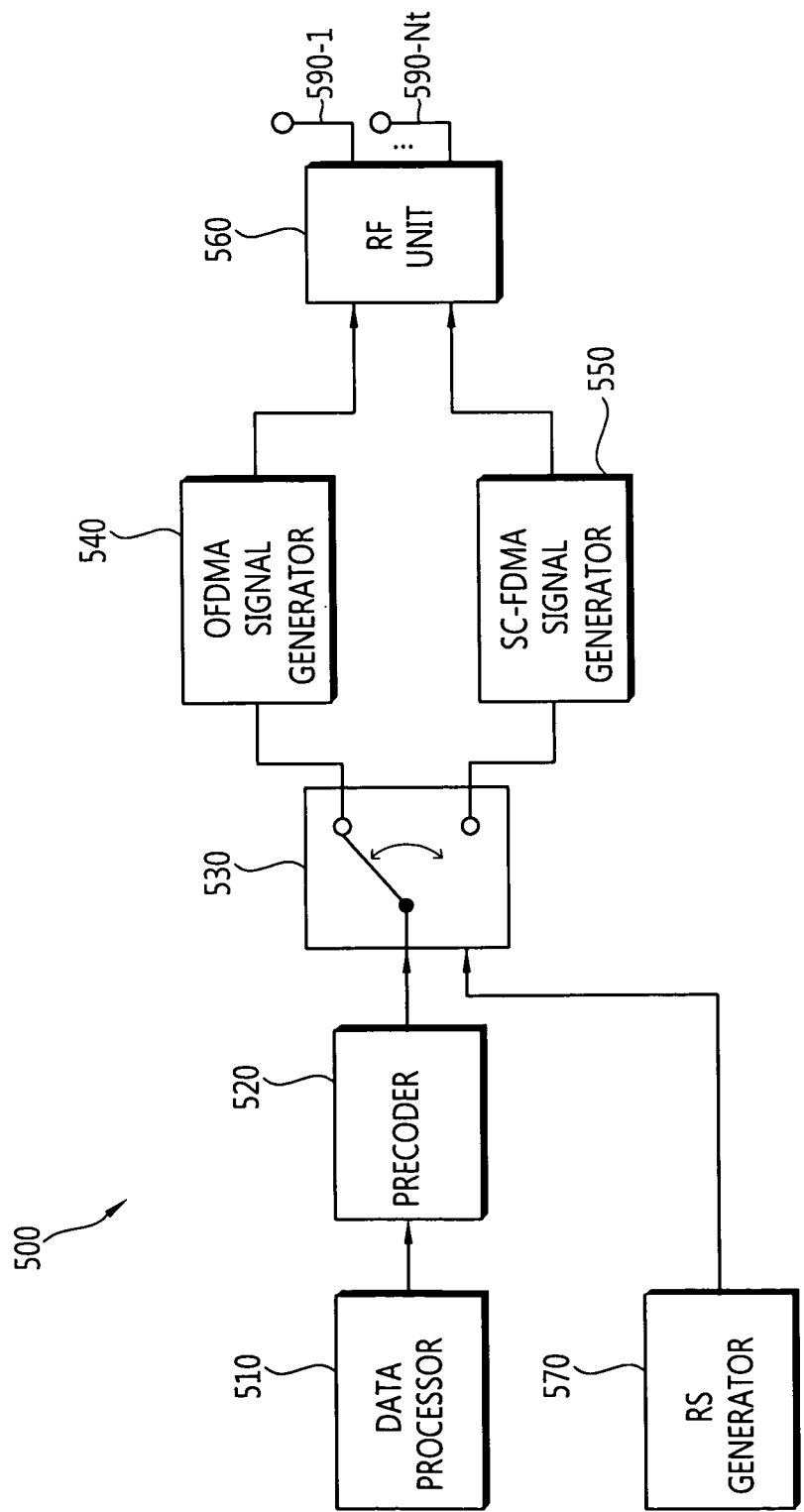
FIG. 17 is a block diagram of a transmitter supporting SC-FDMA/OFDMA.

FIG. 17 is a block diagram of a transmitter supporting SC-FDMA/OFDMA. A transmitter 500 includes a data processor 510, a precoder 520, a signal switching unit 530, an OFDMA signal generator 540, an SC-FDMA signal generator 550 and a RS generator 570. The data processor 510 processes information bits to generate at least one data stream. The RS generator 570 generates a RS. The precoder 520 precodes the data stream output from the data processor 510. The signal switching unit 530 switches a signal input thereto to a signal in an OFDMA mode or an SC-FDMA mode according to a specific criterion or an instruction of a BS. The OFDMA signal generator 540 generates an OFDMA-modulated time domain signal. The SC-FDMA signal generator 550 generates an SC-FDMA-modulated time domain signal. The time domain signals output from the OFDMA signal generator 540 and the SC-FDMA signal generator 550 are converted into radio signals by an RF unit 560 and transmitted through multiple transmit antennas 590-1 through 590-Nt.

To support an SC-FDMA/OFDMA hybrid operation, a BS and UEs must know whether a scheduled channel uses SC-FDMA or OFDMA.

To achieve this, the BS can transmit a switching indicator that indicates whether switching between OFDMA and SC-FDMA occurs to the UEs. The switching indicator indicates whether OFDMA or SC-FDMA is used for PUSCH transmission. It is favorable that a UE located at the edge of a cell uses SC-FDMA and a UE located in the cell uses OFDMA, and thus the BS can switch the SC-FDMA mode to the OFDMA mode or switch the OFDMA mode to the SC-FDMA mode through the switching indicator according to the position of a UE in the cell. The switching indicator can be transmitted as a part of uplink grant on PDCCH or transmitted through an RLC message.

The OFDMA mode and SC-FDMA mode can be previously defined according to MIMO transmission mode of PUSCH or modulation order. For example, the SC-FDMA and OFDMA modes can be defined in various manners as represented in Table 5.

TABLE 5

| Type | OFDMA mode | SC-FDMA mode |
|---|---|---|
| 1 | SU-MIMO having rank higher than 1 and using precoding, SFBC | Other modes (SU-MIMO using no precoding, beamforming, CDD, block-STBC, antenna switching/selection, single transmit antenna) |
| 2 | SU-MIMO having rank higher than 1, SFBC | Other modes (SU-MIMO having rank of 1, beamforming, CDD, block-STBC, antenna switching/selection, single transmit antenna) |
| 3 | SU-MIMO, beamforming, SFBC | Other modes (CDD, antenna switching/selection, single transmit antenna) |
| 4 | SU-MIMO, beamforming, SFBC, CDD | Other modes (antenna switching/selection, single transmit antenna) |
| 5 | Multi-stream transmission (SU-MIMO) or high-order transmission (16-QAM or higher), SFBC | Single stream transmission having low-order transmission (QPSK or lower), block-STBC |

III-1. Same RS Structure of SC-FDMA/OFDMA

Both the SC-FDMA mode and OFDMA mode use the same RS structure. For example, both the SC-FDMA mode and OFDMA mode use a single OFDMA symbol for RS transmission in each slot. In SU-MIMO having a rank greater than 1 and using OFDMA, an available precoding matrix can be selected by a UE or allocated by a BS. The UE is required to transmit multiple RSs for demodulating multiple streams. The aforementioned allocation method described in clause II-1 can be used for allocation of multiple RSs.

Similarly to the above-described SC-FDMA based RS design, two design options including a precoded RS and/or a non-precoded RS are available for the SC-FDMA/OFDMA hybrid system. While a non-precoded RS is suitable for SFBC or block-STBC, any one of the precoded RS and non-precoded RS can be used for SU-MIMO or CDD.

Though both the SC-FDMA mode and OFDMA mode use the same RS structure, the precoded RS and non-precoded RS can be changed with each other according to SC-FDMA/OFDMA. Furthermore, the precoded RS and non-precoded RS can be changed with each other according to a precoding mode. The BS can provide additional signaling to UEs for switching between the precoded RS and non-precoded RS. Moreover, a method using the precoded RS and a method using the non-precoded RS can be set in advance.

III-2. Use of Two-Dimensional RS Pattern in OFDMA Mode

The OFDMA mode can use a two-dimensional RS pattern over the time domain and the frequency domain to be optimized to uplink OFDM transmission while the SC-FDMA mode uses a one-dimensional RS that occupies a single entire OFDMA symbol (SC-FDMA RS symbol) in each slot.

Figure 18:
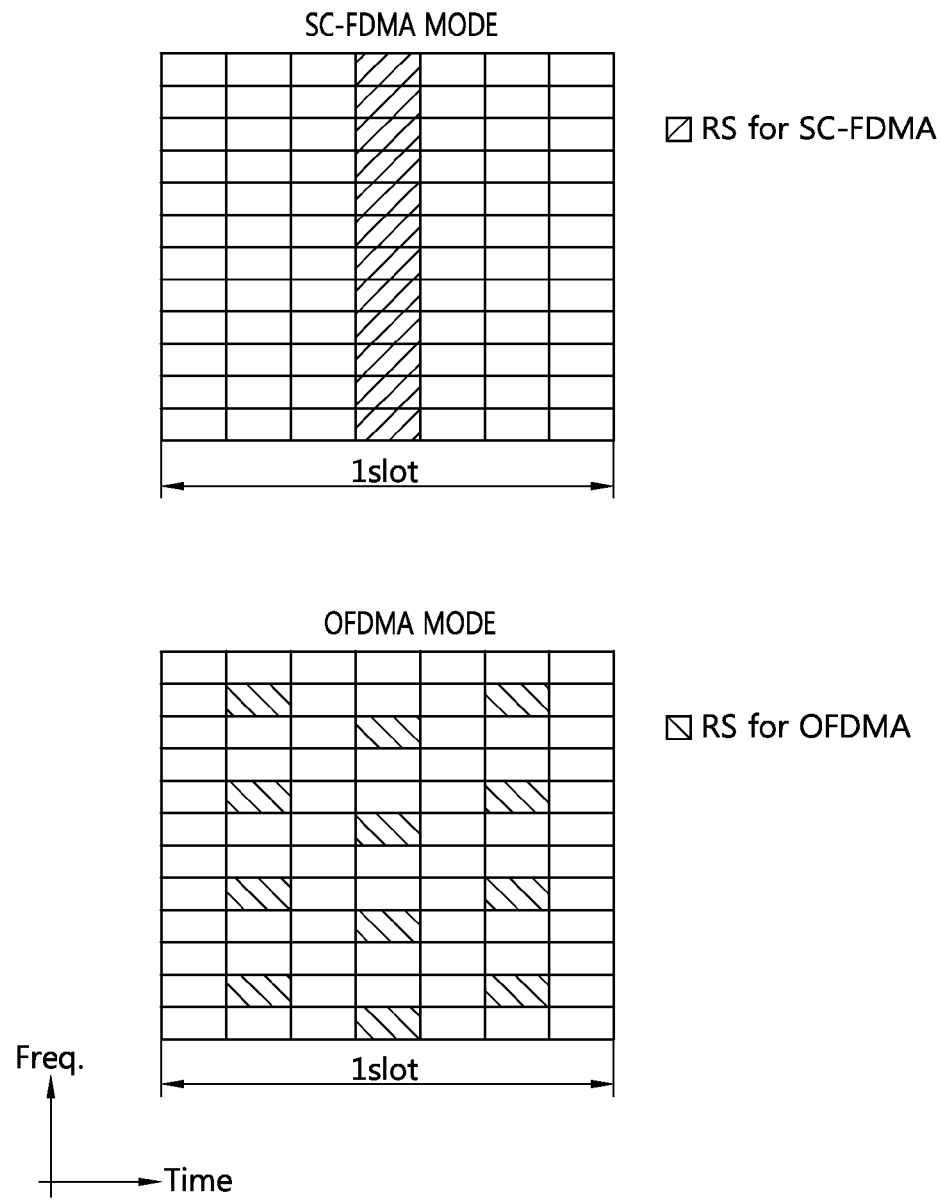
FIG. 18 illustrates an example of RS structures according to the SC-FDMA and OFDMA modes.

FIG. 18 illustrates an example of RS structures according to the SC-FDMA and OFDMA modes. In the SC-FDMA mode, a RS is transmitted over a single SC-FDMA RS symbol owing to single carrier property. On the contrary, in the OFDMA mode, a RS is transmitted for the time domain and the frequency domain according to a RS pattern. The RS patterns illustrated in FIG. 18 are exemplary and can be varied in various forms based on the number of subcarriers, the number of OFDMA symbols, etc.

In the OFDMA mode, a data stream and/or a RS is allocated to even an OFDMA symbol corresponding to the position of an SC-FDMA RS symbol, and thus a data transmission rate can be increased. In this case, however, severe interference may occur among other UEs performing SDMA to deteriorate channel estimation performance.

Figure 19:
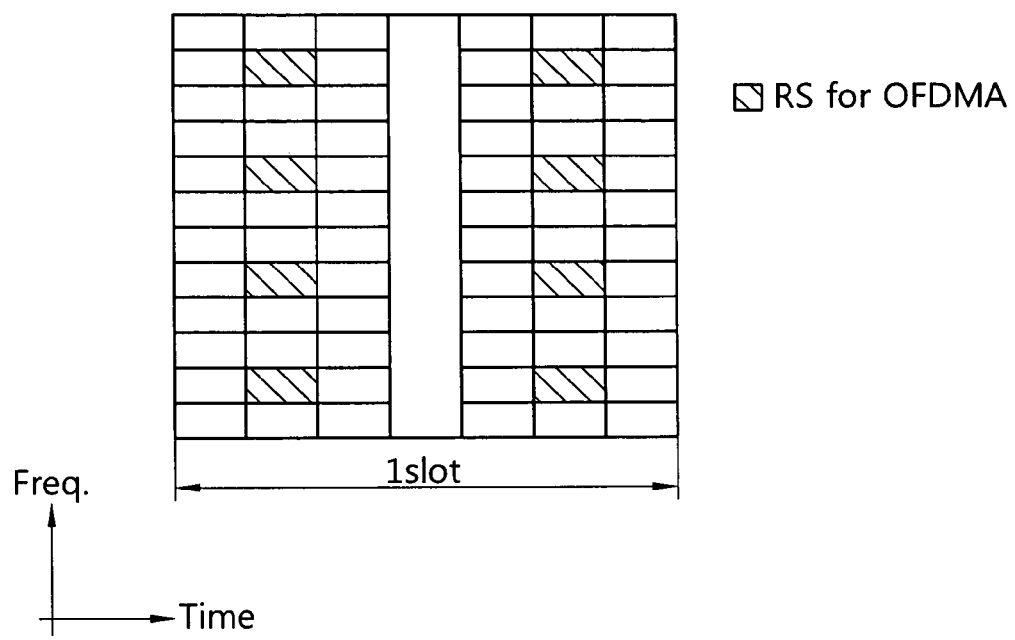
FIG. 19 illustrates another example of a RS structure according to the OFDMA mode.

FIG. 19 illustrates another example of a RS structure according to the OFDMA mode. Differently from the example shown in FIG. 18, any uplink transmission is not performed for an OFDMA symbol corresponding to the position of an SC-FDMA RS in the OFDMA mode. This may decrease the data transmission rate. However, the RS structure shown in FIG. 19 may increase channel estimation performance of other SDMA users and use the SC-FDMA RS for noise intensity estimation to improve equalization performance. In the OFDMA mode, it is possible to leave the SC-FDMA RS symbol as a null symbol or prevent transmission of the SC-FDMA RS symbol through puncturing.

In the OFDMA mode, whether a RS pattern that ignores the SC-FDMA RS symbol is used or the SC-FDMA RS symbol is not transmitted may be set in advance or instructed by the BS through an additional indicator.

A precoded RS or a non-precoded RS may be used as the RS pattern for the OFDMA mode. The advantage of the precoded RS for maintaining low PAPR characteristic in the SC-FDMA mode is not efficient any more. Precoding may use a single RS or multiple RSs. If a single RS is allocated, the precoded RS is better for the RS pattern for the OFDMA mode. In the OFDMA mode, SFBC requires multiple RSs for enabling channel estimation related to multiple transmit antennas.

III-3. RS Structure Compatible Between SC-FDMA and OFDMA

The SC-FDMA mode uses the SC-FDMA RS symbol and the OFDMA mode uses both the SC-FDMA RS symbol and the two-dimensional RS pattern.

FIG. 20 illustrates an example of RS structures according to the SC-FDMA and OFDMA modes. In the SC-FDMA mode, a RS is transmitted for a single SC-FDMA RS symbol due to single carrier property. In the OFDMA mode, a RS is transmitted according to the SC-FDMA RS symbol and a RS pattern. The RS patterns shown in FIG. 20 are exemplary and can be varied in various forms based on the number of subcarriers, the number of OFDMA symbols, etc.

In the OFDMA mode, the SC-FDMA RS symbol is used to transmit a plurality of non-precoded RSs (or precoded RSs, when a rank is 1 in particular). Furthermore, at least one RS is transmitted according to the RS pattern. The RS on the RS pattern may be precoded or non-precoded. In the OFDMA mode, a BS can obtain a channel from the RS on the SC-FDMA RS symbol first, and then use the RS on the RS pattern to improve MIMO channel estimation performance. Although overhead caused by the RS may increase when the whole SC-FDMA RS symbol is used as the RS in the OFDMA mode, channel estimation performance improved due to the SC-FDMA RS symbol can offset the increased RS overhead because multi-stream transmission is used in a high signal-to-noise ratio (SNR) environment in which channel estimation performance is an important factor for obtaining a high transmission rate.

Figure 21:
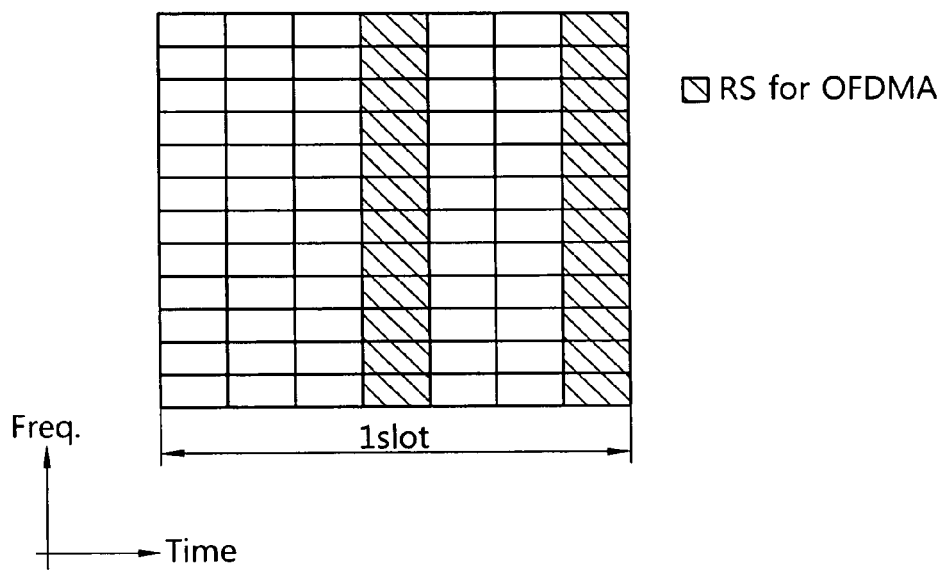
FIG. 21 illustrates another example of a RS structure according to the OFDMA mode.

FIG. 21 illustrates another example of a RS structure according to the OFDMA mode. Differently from the example shown in FIG. 20, at least one OFDMA symbol as well as the SC-FDMA RS symbol is allocated for RS transmission. Streams (layers) can be identified according to time domain orthogonalization or both the time domain orthogonalization and code domain orthogonalization. The code domain orthogonalization can be obtained according to different cyclic shifts, Walsh code, DFT matrix and a combination thereof.

Additional downlink control information can be exchanged between the BS and a UE for the aforementioned SC-FDMA/OFDMA RS structures. For example, signaling representing whether the SC-FDMA RS symbol is used, whether the RS pattern is used and whether the SC-FDMA RS symbol and the RS pattern are simultaneously used is required in the OFDMA mode. Furthermore, signaling representing whether a precoded RS or a non-precoded RS is used is also required in the OFDMA mode or the SC-FDMA mode. This is because a UE can selectively use the precoded RS and the non-precoded RS although the UE can use the precoded RS or the non-precoded RS all the time. This control information can be transmitted to the UE from the BS in the form of system information, RLC message or PDCCH.

Figure 22:
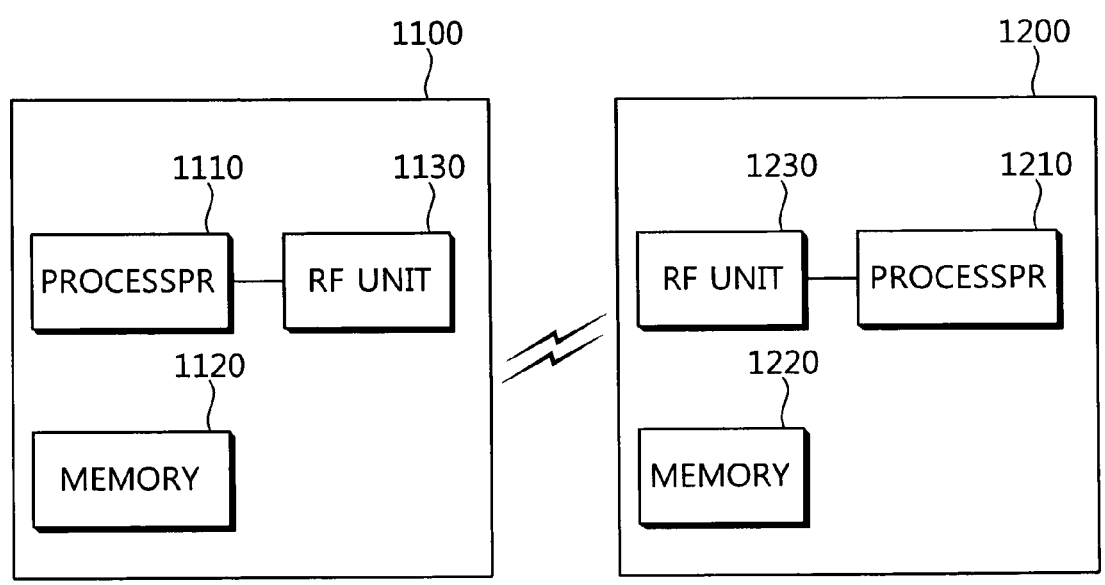
FIG. 22 is a block diagram showing wireless communication system to implement an embodiment of the present invention.

FIG. 22 is a block diagram showing wireless communication system to implement an embodiment of the present invention. A BS 1100 may include a processor 1110, a memory 1120 and a radio frequency (RF) unit 1130. The processor 1110 may be configured to implement proposed functions, procedures and/or methods described in this description. The processor 1110 may determine the resource and configuration for uplink RSs and inform the information to a UE 1200. The memory 1120 is operatively coupled with the processor 1110 and stores a variety of information to operate the processor 1110. The RF unit 1130 is operatively coupled with the processor 1110, and transmits and/or receives a radio signal. A UE 1200 may include a processor 1210, a memory 1220 and a RF unit 1230. The processor 1210 may be configured to implement proposed functions, procedures and/or methods described in this description. The processor 1210 may generate a precoded RS and/or a non-precoded RS and determine whether the precoded RS or the non-precoded RS is used. The memory 1220 is operatively coupled with the processor 1210 and stores a variety of information to operate the processor 1210. The RF unit 1230 is operatively coupled with the processor 1210, and transmits and/or receives a radio signal.

The processors 1110, 1210 may include application-specific integrated circuit (ASIC), other chipset, logic circuit and/or data processing device. The memories 1120, 1220 may include read-only memory (ROM), random access memory (RAM), flash memory, memory card, storage medium and/or other storage device. The RF units 1130, 1230 may include baseband circuitry to process radio frequency signals. When the embodiments are implemented in software, the techniques described herein can be implemented with modules (e.g., procedures, functions, and so on) that perform the functions described herein. The modules can be stored in memories 1120, 1220 and executed by processors 1110, 1210. The memories 1120, 1220 can be implemented within the processors 1110, 1210 or external to the processors 1110, 1210 in which case those can be communicatively coupled to the processors 1110, 1210 via various means as is known in the art.

Uplink transmission using multiple transmit antennas is supported through reference signal design and related control signaling. Uplink transmission efficiency can be increased so as to improve the overall performance of a wireless communication system.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method of transmitting a signal in a wireless communication system, the method performed in a single user equipment (UE) comprising:

receiving single cyclic information via a physical downlink control channel (PDCCH); and transmitting, in response to the single cyclic information, reference signals through a first transmit antenna and a second transmit antenna using one pair of available cyclic shift pairs, each pair of the available cyclic shift pairs comprising a first cyclic shift $n_1$, for the first transmit antenna and a second cyclic shift $n_2$ for the second transmit antenna, the first and second transmit antennas being used by the single UE, wherein the single cyclic information indicates the first cyclic shift $n_1$, the second cyclic shift $n_2$ is cyclic shift, $n_1$ and $n_2$" is replaced by determined based on the first cyclic shift $n_1$ in the UE, $n_1$ and $n_2$ contained in one pair of the available cyclic shift pairs are different from cyclic shifts $n_1$ and $n_2$ contained in another pair of the available cyclic shift pairs, respectively, and an interval between the $n_1$ and $n_2$ in each pair of the available cyclic shift pairs is set to a same value.

2. The method of claim 1, wherein the second cyclic shift is determined such that the interval between the $n_1$ and $n_2$ is maximized.

3. The method of claim 1, wherein the reference signals are used for data demodulation.

4. The method of claim 1, wherein the single cyclic information is determined by a base station (BS).

5. The method of claim 1, wherein the reference signals are generated from a base sequence, and the base sequence comprises a Zadoff Chu sequence.

6. The method of claim 1, wherein the UE further comprises a third transmit antenna and a fourth transmit antenna, and a third cyclic shift is set for the third transmit antenna and a fourth cyclic shift is set for the fourth transmit antenna.

7. The method of claim 6, wherein the third and fourth cyclic shifts are determined such that the interval between the cyclic shifts is maximized.

8. A method of transmitting a signal in a wireless communication system, the method performed in a single user equipment (UE) comprising:

receiving single cyclic information via a physical downlink control channel (PDCCH); and transmitting, in response to the single cyclic information, reference signals through a first transmit antenna and a second transmit antenna using one pair of available cyclic shift pairs, each pair of the available cyclic shift pairs comprising a first cyclic shift $n_1$ for the first transmit antenna and a second cyclic shift $n_2$ for the second transmit antenna, the first and second transmit antennas being used by the single UE, wherein the single cyclic information indicates the first cyclic shift $n_1$, the second cyclic shift $n_2$ is determined based on the first cyclic shift $n_1$ in the UE, cyclic shifts contained in each pair of the available cyclic shift pairs are predetermined, and one pair of the available cyclic shift pairs $(n_1, n_2)$ includes one of (0,4), (1,5), (2,6), and (3,7).

9. The method of claim 8, wherein the reference signals are used for data demodulation.

10. The method of claim 8, wherein the single cyclic information is determined by a base station (BS).

11. The method of claim 8, wherein the reference signals are generated from a base sequence, and the base sequence comprises a Zadoff Chu sequence.

12. A user equipment (UE) in a wireless communication system, the UE comprising:

a receiver configured for receiving single cyclic information via a physical downlink control channel (PDCCH); and a transmitter configured for transmitting, in response to the single cyclic information, reference signals through a first transmit antenna and a second transmit antenna using one pair of available cyclic shift pairs, each pair of the available cyclic shift pairs comprising a first cyclic shift $n_1$ for the first transmit antenna and a second cyclic shift $n_2$ for the second transmit antenna, the first and second transmit antennas being used by a single UE, wherein the single cyclic information indicates the first cyclic shift $n_1$, the second cyclic shift $n_2$ is determined based on the first cyclic shift $n_1$ in the UE, cyclic shifts contained in each pair of the available cyclic shift pairs are predetermined, and one pair of the available cyclic shift pairs $(n_1, n_2)$ includes one of (0,4), (1,5), (2,6), and (3,7).

13. The user equipment of claim 12, wherein the reference signals are used for data demodulation.

14. The user equipment of claim 12, wherein the single cyclic information is determined by a base station (BS).

15. The user equipment of claim 12, wherein the reference signals are generated from a base sequence, and the base sequence comprises a Zadoff Chu sequence.

16. A user equipment (UE) in a wireless communication system, the UE comprising:

a receiver configured for receiving single cyclic information via a physical downlink control channel (PDCCH); and a transmitter configured for transmitting, in response to the single cyclic information, reference signals through a first transmit antenna and a second transmit antenna using one pair of available cyclic shift pairs, each pair of the available cyclic shift pairs comprising a first cyclic shift $n_1$ for the first transmit antenna and a second cyclic shift $n_2$ for the second transmit antenna, the first and second transmit antennas being used by a single UE, wherein the single cyclic information indicates the first cyclic shift $n_1$, the second cyclic shift $n_2$ is determined based on the first cyclic shift $n_1$ in the UE, $n_1$ and $n_2$ contained in one pair of the available cyclic shift pairs are different from cyclic shifts $n_1$ and $n_2$ contained in another pair of the available cyclic shift pairs, respectively, and an interval between the $n_1$ and $n_2$ in each pair of the available cyclic shift pairs is set to a same value.

\* \* \* \* \*

UNITED STATES PATENT AND TRADEMARK OFFICE
CERTIFICATE OF CORRECTION

Page 1 of 1

PATENT NO. : 8,503,561 B2
APPLICATION NO. : 12/458216
DATED : August 6, 2013
INVENTOR(S) : Byoung-Hoon Kim et al.

It is certified that error appears in the above-identified patent and that said Letters Patent is hereby corrected as shown below:

In the Claims

In claim 1, lines 15-16 (col. 19, lines 40-41), cancel the following text "cyclic shift, n1 and n2" is replaced by".

In claim 8, line 13 (col. 20, line 10) separate the clause beginning with the words "wherein the single cyclic information indicates..." from the preceding clause beginning at claim 8, line 6 (col. 20, line 3) with the words "transmitting, in response to the single ...".

In claim 12, line 14 (col. 20, line 37) separate the clause beginning with the words "wherein the single cyclic information indicates..." from the preceding clause beginning at claim 12, line 6 (col. 20, line 29) with the words "a transmitter configured for transmitting ...".

Signed and Sealed this
Eighteenth Day of February, 2014

Michelle K. Lee
*Deputy Director of the United States Patent and Trademark Office*